(12) United States Patent
Goteti et al.

(10) Patent No.: US 12,536,584 B1
(45) Date of Patent: Jan. 27, 2026

(54) AUTOMATED LOAN PRODUCTION SYSTEMS, METHODS, AND MEDIA

(71) Applicant: FinMkt, Inc., New York, NY (US)

(72) Inventors: Srikanth Goteti, Scarsdale, NY (US); Nathan Barber, Darien, CT (US); Alice Tera Cox, Brooklyn, NY (US)

(73) Assignee: FinMkt, Inc., New York, NY (US)

( * ) Notice: Subject to any disclaimer, the term of this patent is extended or adjusted under 35 U.S.C. 154(b) by 0 days.

(21) Appl. No.: 18/662,782

(22) Filed: May 13, 2024

Related U.S. Application Data

(63) Continuation of application No. 16/930,848, filed on Jul. 16, 2020, now Pat. No. 11,983,768.

(60) Provisional application No. 62/875,085, filed on Jul. 17, 2019.

(51) Int. Cl.
| | |
|---|---|
| *G06Q 20/00* | (2012.01) |
| *G06F 16/953* | (2019.01) |
| *G06Q 20/08* | (2012.01) |
| *G06Q 20/20* | (2012.01) |
| *G06Q 20/40* | (2012.01) |
| *G06Q 40/03* | (2023.01) |

(52) U.S. Cl.
CPC .......... *G06Q 40/03* (2023.01); *G06F 16/953* (2019.01); *G06Q 20/085* (2013.01); *G06Q 20/202* (2013.01); *G06Q 20/4016* (2013.01)

(58) Field of Classification Search
CPC .... G06Q 40/03; G06Q 20/085; G06Q 20/202; G06Q 20/4016; G06F 16/953
See application file for complete search history.

(56) References Cited

U.S. PATENT DOCUMENTS

| | | | |
|---|---|---|---|
| 5,797,133 | A | 8/1998 | Jones et al. |
| 6,029,149 | A * | 2/2000 | Dykstra ................. G06Q 40/03 705/38 |
| 6,438,526 | B1 | 8/2002 | Dykes et al. |
| 6,775,782 | B1 | 8/2004 | Buros et al. |
| 7,444,302 | B2 | 10/2008 | Hu et al. |
| 7,873,569 | B1 | 1/2011 | Cahn |

(Continued)

FOREIGN PATENT DOCUMENTS

| | | |
|---|---|---|
| CA | 2778955 | 12/2012 |

OTHER PUBLICATIONS

Notice of Allowance dated Jan. 31, 2024 in U.S. Appl. No. 16/930,848, pp. 1-11.

(Continued)

*Primary Examiner* — Rokib Masud
(74) *Attorney, Agent, or Firm* — Byrne Poh LLP

(57) ABSTRACT

Automated loan production systems, methods, and media are provided. For example, the disclosed subject matter can provide a point-of-sale platform that sources the borrower, captures the borrower's information in the form of a consumer loan application at a point-of-sale, underwrites the borrower based on criteria provided by lending partners, underwrites one or more merchants for inclusion on the point-of-sale platform, matches multiple loan offers from multiple lending partners based on borrower and lender requirements, presents loan documents of a selected loan for electronic signature between the merchant and the borrower, disburses funds from the lender to the merchant, and provides reporting to merchants, partners, lenders, and other entities through respective portals.

20 Claims, 36 Drawing Sheets

(56) References Cited

U.S. PATENT DOCUMENTS

| | | | |
|---|---|---|---|
| 12,106,364 B1 | 10/2024 | Goteti et al. | |
| 2001/0037287 A1 | 11/2001 | Broadbent et al. | |
| 2002/0161630 A1 | 10/2002 | Kern et al. | |
| 2004/0034592 A1 | 2/2004 | Hu et al. | |
| 2005/0065871 A1 | 3/2005 | Gerhart et al. | |
| 2005/0187860 A1* | 8/2005 | Peterson | G06Q 40/02 705/38 |
| 2005/0234814 A1 | 10/2005 | Jones et al. | |
| 2006/0178983 A1 | 8/2006 | Nice et al. | |
| 2007/0226128 A1 | 9/2007 | Wiryawan et al. | |
| 2011/0004527 A1* | 1/2011 | Ash | G06Q 20/20 705/17 |
| 2011/0112957 A1 | 5/2011 | Ingram et al. | |
| 2011/0125632 A1 | 5/2011 | Neel | |
| 2012/0239444 A1 | 9/2012 | Williams | |
| 2013/0297488 A1 | 11/2013 | Boyanov et al. | |
| 2015/0066740 A1 | 3/2015 | DiCarlo | |
| 2015/0339769 A1 | 11/2015 | deOliveria et al. | |
| 2017/0230375 A1* | 8/2017 | Kurian | G06Q 20/382 |

OTHER PUBLICATIONS

Notice of Allowance dated Feb. 23, 2022 in U.S. Appl. No. 16/930,848, pp. 1-21.

Notice of Allowance dated Jun. 21, 2024 in U.S. Appl. No. 15/485,096, pp. 1-130.

Notice of Allowance dated Oct. 4, 2023 in U.S. Appl. No. 16/930,848, pp. 1-27.

Notice of Allowance dated Nov. 7, 2022 in U.S. Appl. No. 16/930,848, pp. 1-11.

Notice of Allowance dated Jun. 16, 2023 in U.S. Appl. No. 16/930,848, pp. 1-26.

Office Action dated Mar. 8, 2022 in U.S. Appl. No. 15/485,096, pp. 1-8.

Office Action dated Mar. 20, 2024 in U.S. Appl. No. 15/485,096, pp. 1-8.

Office Action dated Apr. 14, 2022 in U.S. Appl. No. 16/930,848, pp. 1-15.

Office Action dated Apr. 15, 2020 in U.S. Appl. No. 15/485,096, pp. 1-41.

Office Action dated Jun. 24, 2021 in U.S. Appl. No. 16/930,848, pp. 1-16.

Office Action dated Jul. 20, 2021 in U.S. Appl. No. 15/485,096, pp. 1-33.

Office Action dated Aug. 21, 2019 in U.S. Appl. No. 15/485,096, pp. 1-41.

Office Action dated Oct. 13, 2023 in U.S. Appl. No. 15/485,096, pp. 1-40.

Office Action dated Oct. 28, 2020 in U.S. Appl. No. 15/485,096, pp. 1-47.

Office Action dated Nov. 9, 2022 in U.S. Appl. No. 15/485,096, pp. 1-11.

Serrano-Cinca, C., et al., "Determinants of Default in P2P Lending", In PLoS ONE, vol. 10, No. 10, Oct. 2015, pp. 1-14.

* cited by examiner

Start Growing Your Business Today

Provide a few quick details below to get started!

Individual Completing Application

| First Name | Last Name |
| Email | Work Phone |

Company Information

| Program ▾ | Sub-Program ▾ |
| Business Legal Name | Federal Tax ID |
| Business Name (DBA) | Business Entity Type ▾ |
| Business Phone | Business Email |
| Date Incorporated | State of Incorporation ▾ |
| Business Start Date | Website URL |
| Annual Sales Revenue | Annual Finance Volume |
| Average Ticket Size | Number Of Locations |

Physical Address (No PO Boxes)

| Address 1 | Address 2 |
| City | State ▾ | Zip |

FIG. 3A

Mailing Address ☐ Same as Physical address

| Address 1 | | Address 2 | |
|---|---|---|---|
| City | State | | Zip |

Principal/Owner Information

☐ I am an owner/principal

| First Name | Last Name |
|---|---|
| Email Address | Phone Number |
| Ownership Start Date | 👁 Social Security Number |
| Ownership % | Date of Birth (mm/dd/yyyy) |

Residential Address

| Address 1 | | Address 2 | |
|---|---|---|---|
| City | State | | Zip |

Add Owner

By checking the box below you verify that you have read and agree to the Merchant Agreement and Disclosures I authorize FinMkt to verify or obtain further information as it may deem necessary concerning the entity and its Partners and Owners, including the use of credit reporting agencies.

☐ I certify that all the information is true and accurate to the best of my knowledge.
By submitting this application, I certify that I have read and agree to the Merchant Agreement and Disclosures.

Submit Application

FIG. 3B

Policy Configuration

| Policy ID | Criteria ID | Criteria Description | Minimum | Score | Knock Out? |
|---|---|---|---|---|---|
| 345 | 6 | Annual Sales Revenue | 15000 | 30 | Y |
| 345 | 7 | Length in Business | 12 | 20 | Y |
| 345 | 8 | Street Adress | Match | 10 | N |
| 345 | 9 | City | Match | 10 | N |
| 345 | 10 | State | Match | 10 | N |
| 345 | 11 | Zip Code | Match | 10 | N |
| 345 | 12 | Business Status | Active | 50 | Y |
| 345 | 13 | Bankruptcy | < 3 years | 40 | Y |

Length in Business Tiers

| Tier | Tier Max | Weight |
|---|---|---|
| 1 | 18 | 0.1 |
| 2 | 24 | 0.25 |
| 3 | 30 | 0.5 |
| 4 | 36 | 0.75 |
| 5 | 42 | 1 |

Annual Sales Revenue Tiers

| Tier | Tier Max | Weight |
|---|---|---|
| 1 | 150000 | 0.1 |
| 2 | 250000 | 0.25 |
| 3 | 500000 | 0.5 |
| 4 | 1000000 | 0.75 |
| 5 | 2000000 | 1 |

Sub Program Policy Configuration

| Sub Prog. ID | Sub Program | Program | Policy ID |
|---|---|---|---|
| 123 | HVAC | HI | 345 |
| 124 | Roofing | HI | 346 |
| 125 | Windows/Doors | HI | 347 |

You're all done for now!

Thank you for choosing 'Lender' to finance your home improvement project. Your loan has been approved and you have 90 days to complete your work. Here is what you can expect next:

1. Your contractor will complete any required installations.

2. Upon completion of your project, your contractor will send you an electronic certificate of completion for you to acknowledge competion of your project.

3. When you sign your final loan documents, your lender will initiate an electronic payment to your contractor within 2-4 business days.

5. Your project is complete!

FIG. 23

AUTOMATED LOAN PRODUCTION SYSTEMS, METHODS, AND MEDIA

CROSS-REFERENCE TO RELATED APPLICATIONS

This application is a continuation of U.S. patent application Ser. No. 16/930,848, filed Jul. 16, 2020, which claims the benefit of U.S. Provisional Patent Application No. 62/875,085, filed Jul. 17, 2019, each of which is hereby incorporated by reference herein in its entirety.

TECHNICAL FIELD

The disclosed subject matter relates to automated loan production systems, methods, and media. More particularly, the disclosed subject matter can provide a point-of-sale platform that sources the borrower, captures the borrower's information in the form of a consumer loan application at a point-of-sale, underwrites the borrower based on criteria provided by lending partners, underwrites one or more merchants for inclusion on the point-of-sale platform, matches multiple loan offers from multiple lending partners based on borrower and lender requirements, presents loan documents of a selected loan for electronic signature between the merchant and the borrower, disburses funds from the lender to the merchant, and provides reporting to merchants, partners, lenders, and other entities through respective portals.

BACKGROUND

Consumers frequently desire to finance a variety of purchases. Consumer loan origination is the process by which a consumer (borrower) applies for a new loan and a lender processes the consumer's application and, if approved, funds the consumer's loan. Loan origination is typically a lengthy process because the consumer's loan application is manually processed by the lender, where the lender reviews the application to determine whether the consumer qualifies for the loan by meeting various approval criteria. Manual processing of an application is unsatisfactorily time-consuming. For the lender, time-consuming application review is expensive and oftentimes involves reviews of obviously unworthy borrowers' applications. For the consumer, time-consuming application review is not practical for point-of-sale purchases. Manual processing of a loan application can also be problematic because the consumer must apply to multiple lenders at once so that (a) multiple loans may be compared and (b) the costs of determining credit-worthiness can be high (e.g., requesting multiple credit reports can generate excess lender fees and/or have a negative impact on a consumer's credit worthiness). In view of the foregoing, a need exists for real-time, automated processing of consumer loan applications.

Accordingly, it is desirable to provide automated loan production systems, methods, and media.

SUMMARY

Automated loan production systems, methods, and media are provided.

In accordance with some embodiments of the disclosed subject matter, a computer-implemented method is provided, the method comprising: electronically receiving, by a point-of-sale platform, from a merchant using a merchant device, a merchant application for incorporating loan offering features from the point-of-sale platform; automatically determining, by the point-of-sale platform, whether to approve the merchant application by: determining an entity type associated with the merchant that submitted the merchant application; determining a fraud score that includes the merchant that submitted the merchant application and one or more principals associated with the merchant, wherein the fraud score includes weighted risk attributes; comparing the fraud score for the merchant with a fraud threshold value to determine whether to approve the merchant application; transmitting the merchant application and a plurality of gathered merchant evidence to a queue associated with a human underwriter for review; and approving the merchant application based on the plurality of gathered merchant evidence and based on clearance of one or more fraud conditions; causing, by the point-of-sale platform, a first user interface for generating a plurality of rate sheets and assigning at least one of the plurality of rate sheets to an offer, wherein each of the plurality of rate sheets is associated with a plan description, a plan type, a term, and a merchant fee; causing, by the point-of-sale platform, the offer to be presented on a merchant webpage; electronically receiving, by a point-of-sale platform, from a consumer using a consumer device, a consumer application for receiving financing from a plurality of lenders to purchase a product on the merchant webpage;

automatically determining, by the point-of-sale platform, whether to approve the consumer application by: verifying an identity of the consumer that submitted the consumer application;

generating a snapshot of the consumer over a particular time period by searching through a plurality of online sources; determining a probability that indicates the likelihood that the consumer is authentic based on the generated snapshot; and approving the consumer application based on the verified identity of the consumer and based on the probability that the consumer is authentic is greater than a threshold probability value; performing a soft credit pull of the consumer; determining a plurality of lending offers that match consumer requirements for purchasing the product on the merchant page and lender requirements of the consumer, the merchant, and the product being purchased; causing at least a portion of the plurality of lending offers to be presented to the consumer device; electronically receiving a selection of a lending offer; performing a hard credit pull of the consumer in response to electronically receiving the selection of the lending offer; and initiating the purchase of the product on the merchant website, wherein funding from a lender associated with the selected lending offer is automatically transmitted to a merchant account and wherein payments from the consumer are recorded and monitored.

In some embodiments, the method further comprises determining whether at least one of the merchant and the one or more principals associated with the merchant is included on a real-time block list based on device information, identity information, email information, phone information, address information, IP information, and location information.

In some embodiments, the plurality of gathered merchant evidence includes consumer reviews of the merchant from the plurality of online sources. In some embodiments, the plurality of gathered merchant evidence includes transmitting a query that includes merchant details and receiving search results responsive to the transmitted query.

In some embodiments, the offer is presented concurrently with the product on the merchant page. In some embodiments, the offer is presented when checking out on the merchant page. In some embodiments, the merchant page is presented on a merchant device at a location.

In some embodiments, the method further comprises determining that information collected from the consumer application and that a plurality of presented disclosures meet the lender requirements of a first lender and does not meet the lender requirements of a second lender prior to presenting the plurality of loan offers, wherein the lender requirements of the second lender includes additional consumer information and different disclosures and wherein the plurality of lending offers include lending offers from the first lender and exclude lending offers from the second lender.

In some embodiments, the method further comprises pausing a loan matching engine from determining whether loan offers from the second lender match the consumer requirements for purchasing the product on the merchant page.

In some embodiments, the method further comprises determining that the additional consumer information has been received and that the different disclosures have been presented to the consumer; causing the loan matching engine to resume the determination of whether loan offers from the second lender match the consumer requirements for purchasing the product on the merchant page; and updating the plurality of plurality of lending offers to include lending offers from the first lender and the second lender.

In accordance with some embodiments of the disclosed subject matter, a system is provided, the system comprising a server that includes a hardware processor, wherein the hardware processor is configured to: electronically receive, from a merchant using a merchant device, a merchant application for incorporating loan offering features from the point-of-sale platform; automatically determine whether to approve the merchant application by: determining an entity type associated with the merchant that submitted the merchant application; determining a fraud score that includes the merchant that submitted the merchant application and one or more principals associated with the merchant, wherein the fraud score includes weighted risk attributes; comparing the fraud score for the merchant with a fraud threshold value to determine whether to approve the merchant application; transmitting the merchant application and a plurality of gathered merchant evidence to a queue associated with a human underwriter for review; and approving the merchant application based on the plurality of gathered merchant evidence and based on clearance of one or more fraud conditions; cause a first user interface for generating a plurality of rate sheets and assigning at least one of the plurality of rate sheets to an offer, wherein each of the plurality of rate sheets is associated with a plan description, a plan type, a term, and a merchant fee; cause the offer to be presented on a merchant webpage; electronically receive, by a point-of-sale platform, from a consumer using a consumer device, a consumer application for receiving financing from a plurality of lenders to purchase a product on the merchant webpage; automatically determine whether to approve the consumer application by: verifying an identity of the consumer that submitted the consumer application; generating a snapshot of the consumer over a particular time period by searching through a plurality of online sources; determining a probability that indicates the likelihood that the consumer is authentic based on the generated snapshot; and approving the consumer application based on the verified identity of the consumer and based on the probability that the consumer is authentic is greater than a threshold probability value; perform a soft credit pull of the consumer; determine a plurality of lending offers that match consumer requirements for purchasing the product on the merchant page and lender requirements of the consumer, the merchant, and the product being purchased; cause at least a portion of the plurality of lending offers to be presented to the consumer device; electronically receive a selection of a lending offer; perform a hard credit pull of the consumer in response to electronically receiving the selection of the lending offer; and initiate the purchase of the product on the merchant website, wherein funding from a lender associated with the selected lending offer is automatically transmitted to a merchant account and wherein payments from the consumer are recorded and monitored.

In accordance with some embodiments of the disclosed subject matter, a non-transitory computer-readable medium containing computer executable instructions that, when executed by a processor, cause the processor to perform a method is provided, the method comprising: electronically receiving, by a point-of-sale platform, from a merchant using a merchant device, a merchant application for incorporating loan offering features from the point-of-sale platform; automatically determining, by the point-of-sale platform, whether to approve the merchant application by: determining an entity type associated with the merchant that submitted the merchant application; determining a fraud score that includes the merchant that submitted the merchant application and one or more principals associated with the merchant, wherein the fraud score includes weighted risk attributes; comparing the fraud score for the merchant with a fraud threshold value to determine whether to approve the merchant application; transmitting the merchant application and a plurality of gathered merchant evidence to a queue associated with a human underwriter for review; and approving the merchant application based on the plurality of gathered merchant evidence and based on clearance of one or more fraud conditions; causing, by the point-of-sale platform, a first user interface for generating a plurality of rate sheets and assigning at least one of the plurality of rate sheets to an offer, wherein each of the plurality of rate sheets is associated with a plan description, a plan type, a term, and a merchant fee; causing, by the point-of-sale platform, the offer to be presented on a merchant webpage; electronically receiving, by a point-of-sale platform, from a consumer using a consumer device, a consumer application for receiving financing from a plurality of lenders to purchase a product on the merchant webpage; automatically determining, by the point-of-sale platform, whether to approve the consumer application by: verifying an identity of the consumer that submitted the consumer application; generating a snapshot of the consumer over a particular time period by searching through a plurality of online sources; determining a probability that indicates the likelihood that the consumer is authentic based on the generated snapshot; and approving the consumer application based on the verified identity of the consumer and based on the probability that the consumer is authentic is greater than a threshold probability value; performing a soft credit pull of the consumer; determining a plurality of lending offers that match consumer requirements for purchasing the product on the merchant page and lender requirements of the consumer, the merchant, and the product being purchased; causing at least a portion of the plurality of lending offers to be presented to the consumer device; electronically receiving a selection of a lending offer; performing a hard credit pull of the consumer in response to electronically receiving the selection of the lending offer; and initiating the purchase of the product on the merchant website, wherein funding from a lender associated with the selected lending offer is automatically transmitted to a merchant account and wherein payments from the consumer are recorded and monitored.

In accordance with some embodiments of the disclosed subject matter, a system is provided, the system comprising: means for electronically receiving, by a point-of-sale platform, from a merchant using a merchant device, a merchant application for incorporating loan offering features from the point-of-sale platform; means for automatically determining, by the point-of-sale platform, whether to approve the merchant application by: determining an entity type associated with the merchant that submitted the merchant application; means for determining a fraud score that includes the merchant that submitted the merchant application and one or more principals associated with the merchant, wherein the fraud score includes weighted risk attributes; means for comparing the fraud score for the merchant with a fraud threshold value to determine whether to approve the merchant application; means for transmitting the merchant application and a plurality of gathered merchant evidence to a queue associated with a human underwriter for review; and means for approving the merchant application based on the plurality of gathered merchant evidence and based on clearance of one or more fraud conditions; means for causing, by the point-of-sale platform, a first user interface for generating a plurality of rate sheets and assigning at least one of the plurality of rate sheets to an offer, wherein each of the plurality of rate sheets is associated with a plan description, a plan type, a term, and a merchant fee; means for causing, by the point-of-sale platform, the offer to be presented on a merchant webpage; means for electronically receiving, by a point-of-sale platform, from a consumer using a consumer device, a consumer application for receiving financing from a plurality of lenders to purchase a product on the merchant webpage; means for automatically determining, by the point-of-sale platform, whether to approve the consumer application by: verifying an identity of the consumer that submitted the consumer application; means for generating a snapshot of the consumer over a particular time period by searching through a plurality of online sources; means for determining a probability that indicates the likelihood that the consumer is authentic based on the generated snapshot; and means for approving the consumer application based on the verified identity of the consumer and based on the probability that the consumer is authentic is greater than a threshold probability value; means for performing a soft credit pull of the consumer; means for determining a plurality of lending offers that match consumer requirements for purchasing the product on the merchant page and lender requirements of the consumer, the merchant, and the product being purchased; means for causing at least a portion of the plurality of lending offers to be presented to the consumer device; means for electronically receiving a selection of a lending offer; means for performing a hard credit pull of the consumer in response to electronically receiving the selection of the lending offer; and means for initiating the purchase of the product on the merchant website, wherein funding from a lender associated with the selected lending offer is automatically transmitted to a merchant account and wherein payments from the consumer are recorded and monitored.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 3A and 3B show illustrative examples of user interfaces for submitting a merchant application in accordance with some embodiments of the disclosed subject matter.

FIG. 5 shows an illustrative example of a policy confirmation associated with a merchant in accordance with some embodiments of the disclosed subject matter.

FIGS. 16 and 17 show illustrative examples of user interfaces for submitting a consumer application in accordance with some embodiments of the disclosed subject matter.

FIG. 21 shows an illustrative example of a user interface for automated memberization for lending partners, such as credit unions, in which the consumer must become a member of the credit union prior to receiving financing in accordance with some embodiments of the disclosed subject matter.

FIG. 23 shows an illustrative example of a user interface for completing the loan application process between the consumer and the lender in accordance with some embodiments of the disclosed subject matter.

DETAILED DESCRIPTION

Automated loan production systems, methods, and media are provided. More particularly, the disclosed subject matter relates to providing real-time lender offer delivery systems that support consumer loan applications, underwriting, offer presentation, documentation, and funding at a point-of-sale.

Generally speaking, the mechanisms described herein allow a merchant to offer credit, loan, and other financial products from multiple lenders to customers through a single application, where each lender may have different credit criteria and different approval standards. To obtain financing for a product or service at a point-of-sale (e.g., an online point-of-sale or a physical point-of-sale), the mechanisms can provide the customer with one or more user interfaces for applying with a single universal loan application, selecting a financial product or service that suits their needs from multiple lenders, and signing one or more required lender financing documents or terms and conditions. This can, for example, save a declined applicant from being forced to constantly reapply with other lenders for funding.

For example, a customer can apply, at the time of purchase, with a single universal loan application. The customer can be prequalified for a maximum amount, thereby allowing the customer to increase their purchase if desired.

Figure 1:
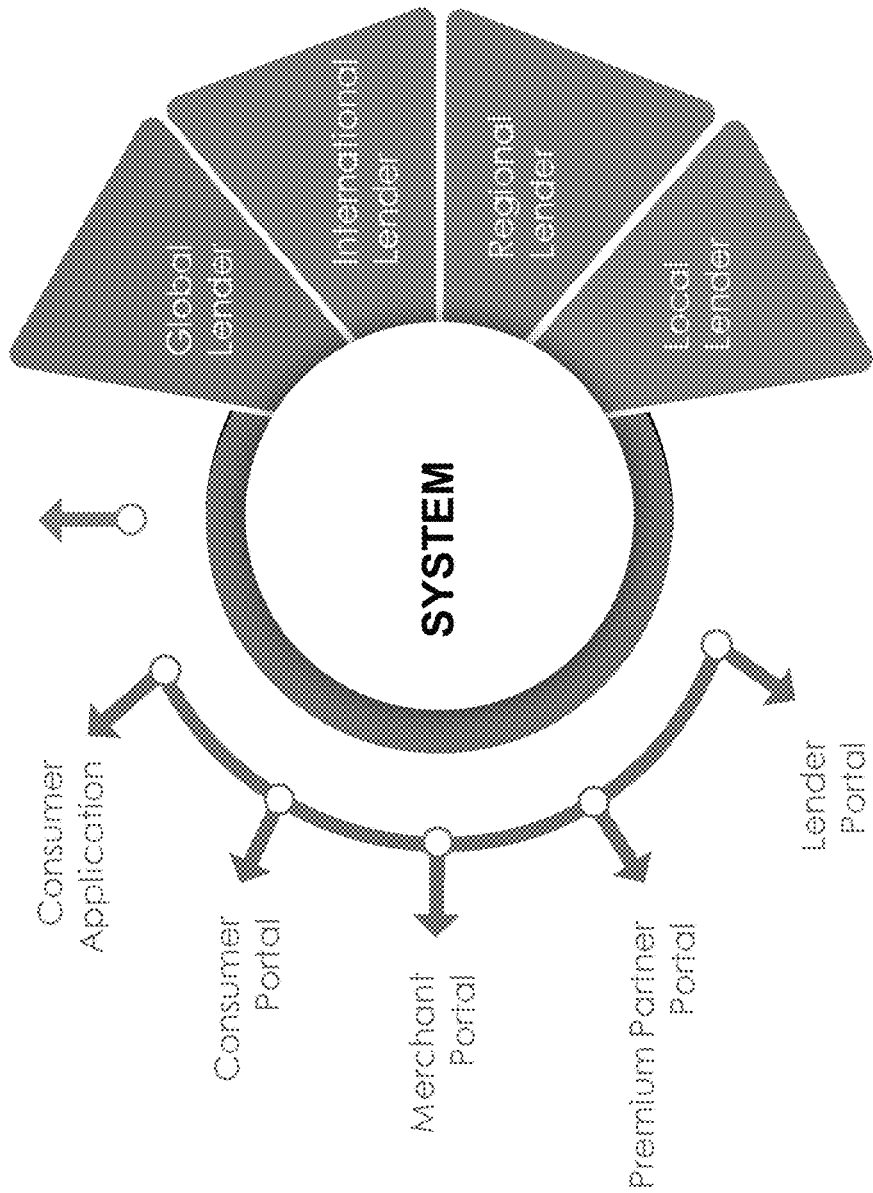
FIG. 1 shows an illustrative example of an overall automated loan production system in accordance with some embodiments of the disclosed subject matter.

In some embodiments, as shown in FIG. 1, the mechanisms can include one or more integrated components including a merchant portal component and a merchant application, a consumer portal component and a consumer application, a lender portal component, a referral partner portal component, a transaction/closed-loop funding platform, and a management platform.

Merchant Portal Component

In some embodiments, the mechanisms can include a merchant portal component. The merchant portal component can, for example, allow a merchant at a merchant device to submit a single application to offer point of sale financing from multiple lenders. It should be noted that the merchant portal component can enable merchants from different industries or verticals (e.g., medical, hard goods, home improvement, etc.) to offer a variety of loan, credit, or other financial products to their customers. It should also be noted that the merchant portal component can enable merchants to facilitate underwriting and funding for a lender with multiple portfolios that have different credit criteria and approval standards. In some embodiments, the merchant portal component can automatically exclude merchants from particular industries (e.g., gambling, alcohol/tobacco, bail bonds, debt collections, pawn shops, adult entertainment, etc.) from using the point of sale platform to offer financing from multiple lending partners.

Figure 2:
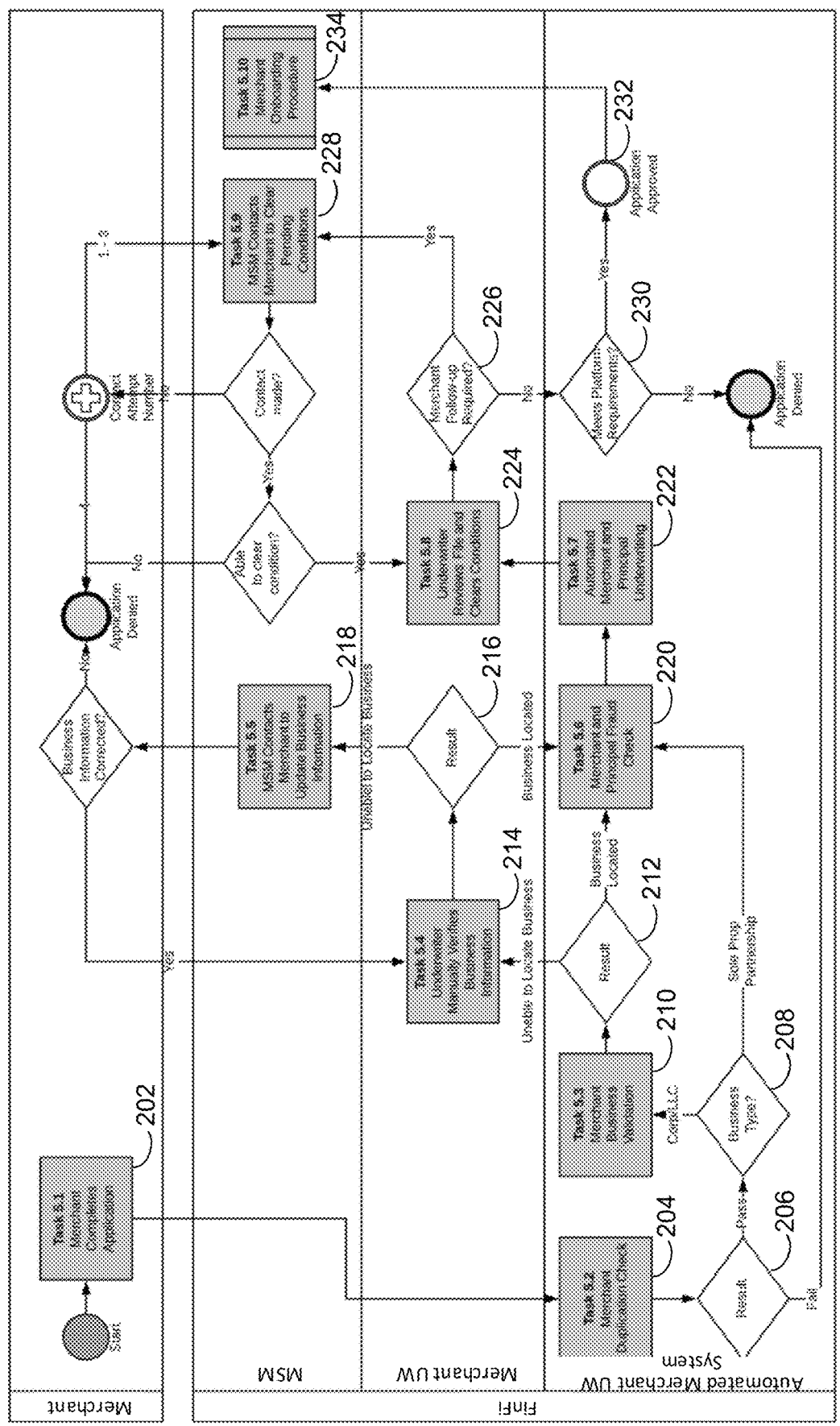
FIG. 2 shows an illustrative example of a process for approving merchant application that includes merchant verification and fraud mitigation in accordance with some embodiments of the disclosed subject matter.

Turning to FIG. 2, an illustrative example 200 of a process for determining whether to approve a merchant application is shown in accordance with some embodiments of the disclosed subject matter. In some embodiments, process 200 can be executed by any suitable device, such as a server that manages multiple merchants and receives lending partner criteria.

In some embodiments, the merchant portal component can begin, at 202, by allowing a merchant at a merchant device to complete a merchant application to offer financing through the point of sale platform. It should be noted that the merchant application can request any suitable merchant information, such as contact information relating to an individual completing the merchant application and company information associated with the merchant (e.g., business legal name, business entity type, date of incorporation, state of incorporation, annual revenue, website information, address information, principal or owner information, etc.). Illustrative examples of user interfaces that can be presented to a merchant on a merchant device for completing a merchant application to offer financing through the point of sale platform are shown in FIGS. 3A and 3B.

It should be noted that, in some embodiments, the merchant portal component can automatically generate a unique link to the merchant application so that the merchant can return to the merchant application (e.g., due to a timeout during the application process, due to accidental closure of the active browser session, etc.).

It should also be noted that, in some embodiments, to be considered for participation in the point of sale platform, the merchant portal component can determine whether a merchant that has submitted a merchant application is a legitimate business and that the business and its principals meet underwriting guidelines of the point of sale platform and underwriting guidelines of the lending partners.

In some embodiments, an automated merchant underwriting system of the point of sale platform can receive the merchant application. For example, the automated underwriting platform can analyze merchant input along with third party data (e.g., FICO, fraud checks, etc.).

Underwriting can be agreed to with one or more lenders that commit to purchase loans having certain parameters. In some embodiments, a dynamic underwriting model can be configured to optimize for current and projected credit performance.

In a more particular example, a loan program in the home improvement industry may have less restrictive thresholds around a minimum length in business parameter than a loan program in the travel industry. These policies can include, but are not limited to, reviews of the merchant's business status, credit, financial state, reputation and the accurate identification of individual backgrounds of the listed owners.

In some embodiments, the automated merchant underwriting system can begin the underwriting process by performing a duplication check that determines whether there are additional instances of the merchant in the point of sale platform at 204. For example, the automated merchant underwriting system can determine whether the merchant that submitted the merchant application already has an active application in process with the point of sale platform. In another example, the automated merchant underwriting system can determine whether the merchant that submitted the merchant application has previously submitted an application with the point of sale platform in which the merchant application was declined. In continuing this example, the automated merchant underwriting system can automatically decline the received merchant application for the same reason that the previously submitted merchant application was declined. In yet another example, the automated merchant underwriting system can determine whether the merchant that submitted the merchant application has an active merchant account on the point of sale platform.

If the automated merchant underwriting system determines that the merchant that submitted the merchant application has not passed the duplication check at 206, the automated merchant underwriting system can automatically decline the merchant application.

In some embodiments, if the automated merchant underwriting system determines that the merchant that submitted the merchant application has passed the duplication check at 206, the automated merchant underwriting system can determine the business entity type associated with the merchant at 208. For example, the automated merchant underwriting system can determine whether the merchant that submitted the merchant application applied as a corporation or limited liability corporation or applied as a sole proprietorship or partnership.

In some embodiments, if the automated merchant underwriting system has determined that the merchant has applied as a corporation, limited liability corporation, or any other suitable business entity, the automated merchant underwriting system can automatically verify and/or validate merchant business information using one or more data sources at 210. For example, the automated merchant underwriting system can compare the business name provided in the merchant application with a name on a Secretary of State business license. In another example, the automated merchant underwriting system can verify whether the Secretary of State business license is active and in good standing. In yet another example, the automated merchant underwriting system can compare the business address provided in the merchant application with an address on a Secretary of State business license. In a more particular example, the automated merchant underwriting system can perform optical character recognition on a Secretary of State business license and compare the extracted business information, such as business name, business address, date of incorporation, entity type, etc., against the business information included in the merchant application submitted by the merchant.

In some embodiments, if the automated merchant underwriting system is unable to verify and/or validate the merchant business information at 212, the automated merchant underwriting system can request that a human underwriter manually verify and/or validate the merchant business information at 214. For example, at 214, the automated merchant underwriting system can place the merchant application in a pending status and automatically assign the merchant application to a human underwriter. In continuing this example, in some embodiments, the human underwriter can be assigned to attempt to verify the merchant business information using one or more data sources. If the human underwriter returns a response that the human underwriter is unable to verify and/or validate the merchant business information at 216, the merchant application can be further assigned to a merchant services manager that contacts the merchant to correct and/or update the business information on the merchant application at 218.

Alternatively, in some embodiments, if the automated merchant underwriting system has determined that the merchant has applied as a sole proprietorship, a partnership, or any other suitable business entity at 208 or if the human underwriter has manually verified and/or validated the merchant business information at 216, the automated merchant underwriting system can perform a fraud check that applies a set of fraud controls at 220 to support fraud mitigation. For example, the automated merchant underwriting system can use a fraud detection engine that checks the email address, mobile phone, device identifier, IP address, and geolocation of the merchant. In another example, the automated merchant underwriting system can determine whether each principal has provided name information, home address information, social security number, and date of birth and has demonstrated a connection with the business and authority to act on behalf of the business in connection with the merchant account. In yet another example, the automated merchant underwriting system can determine whether the merchant and/or the principals associated with the merchant are not listed on a list of sanctioned individuals (e.g. the Specially Designated Nationals and Blocked Persons List provided by the Office of Foreign Assets Control).

Figure 4:
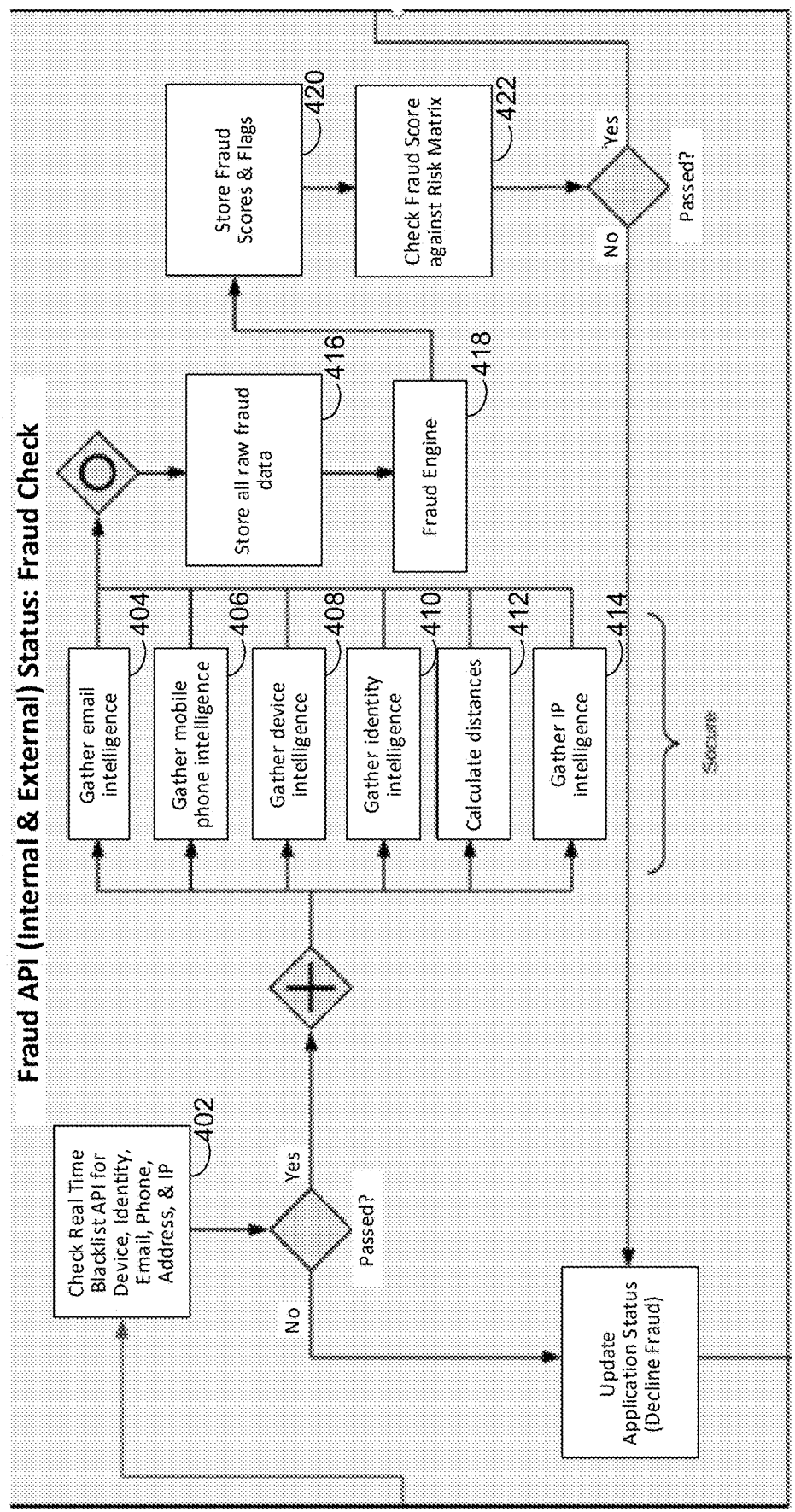
FIG. 4 shows an illustrative example of a process for performing a fraud check on a merchant that submitted a merchant application in accordance with some embodiments of the disclosed subject matter.

A more particular example of a fraud check is shown in FIG. 4. As shown, the fraud controls can include checking an internal real-time block list application programming interface for device, identity, email, phone number, address, and IP address at 402. If, for example, a portion of the merchant information appears on the internal real-time block list, the automated merchant underwriting system can automatically decline the merchant application for fraud reasons. Alternatively, after checking the internal real-time block list application programming interface for device, identity, email, phone number, address, and IP address at 402, the automated merchant underwriting system can proceed to gather additional intelligence, such as email intelligence at 404, mobile phone intelligence at 406, device intelligence at 408, identity intelligence at 410, calculate distances at 412, and IP intelligence at 414. The automated merchant underwriting system can store the gathered intelligence information corresponding to the merchant at 416 and, at a given time, provide the gathered intelligence information to a fraud engine 418.

In some embodiments, the automated merchant underwriting system can generate a risk rating to each underwriting attribute, where these risk ratings can be aggregated with varying weights to generate a merchant risk score. In continuing this example, the merchant risk score can determine which fraud controls are applied on the merchant application. In another example, the merchant risk score can be updated at any suitable interval, where performance (e.g., complaints, call volume, costs, etc.) can be used to adjust the merchant risk score. It should be noted that the risk rating and the weights applied to particular risk ratings can vary by industry. For example, in the home improvement space, the automated merchant underwriting system can review the consumer's profile, the distance from the merchant, products being installed to indicate whether a transaction requires additional review.

In some embodiments, the automated merchant underwriting system can include a neural network, which is configured to receive and process input information to generate and/or update the risk ratings and/or the merchant risk score. For example, a neural network may comprise nodes, which are processing elements that are connected to form the neural network, and directed edges, which are signals sent between the nodes. In continuing this example, the directed edges may each comprise a weight (e.g., a relative importance) associated with them configured to influence the way in which the neural network processes the information associated with each directed edge between the nodes. In order to train the neural network to generate accurate merchant risk scores, the neural network 152 may receive various inputs for the neural network 152 to analyze that can reflect a sliding window of merchant transactions (e.g., merchant reviews, merchant feedback, etc.).

At 420, the fraud scores and flags can be stored. At 422, the fraud score can be compared against a risk matrix for the one or more lending partners for loan programs in the particular industry to determine whether the merchant application should continue through the underwriting process or should be declined altogether or declined only for a specific lender or lenders.

Referring back to FIG. 2, in some embodiments, upon completion of the fraud check of the merchant at 220, the automated merchant underwriting system can perform an automated merchant and principal underwriting process in which the automated merchant underwriting system can obtain and verify merchant and principal attributes at 222. For example, lending partners of the point of sale platform may have additional underwriting requirements. In a more particular example, lending partners may have additional merchant business verification requirements, such as that the business phone number on the merchant application must match the business phone number on verified third-party data sources and that the business type on the merchant application must be listed correctly on the merchant application. In another example, the automated merchant underwriting system can include a business underwriting rule engine that determines whether particular criteria meet approved thresholds, such as combined liens and judgments for a merchant and its principals are less than a particular threshold value (e.g., less than $20,000 in total lien/judgment balance, no active bankruptcies in the last two years, no felonies including fraud, theft, or violent crimes, no misdemeanors including fraud or theft-related crimes, etc.). In yet another example, the automated merchant underwriting system can perform a soft credit check on each of the principals of a merchant. In a more particular example, the automated merchant underwriting system can perform the soft credit check for merchants having an annual revenue less than a particular threshold value (e.g., $5 million) or for merchants having particular business entity types (e.g., sole proprietorships, single member LLCs, limited liability partnerships, S-corps, corporations that have been in business less than one year, etc.). In another more particular example, if the soft credit check on a principal determines that an average principal credit score is less than a particular threshold value (e.g., 620), the automated merchant underwriting system can automatically decline the merchant application.

In some embodiments, the automated merchant underwriting system can apply one or more policies that use weighted data attributes and thresholds when verifying the legitimacy of a merchant. For example, such policies can allow the point of sale platform and its lending partners to weight particular data attributes for generating risk scores. In a more particular example, a specific policy can require that a merchant generate a minimum of $250,000 of sales per year to be considered for inclusion in the loan program, while weighting lack of bankruptcies more than the length of time that the business has been operating. The weighted data attributes can be used to generate a score that declines, pends, or approves a merchant application. An illustrative example of a policy configuration is shown in FIG. 5.

In some embodiments, upon performing the automated merchant and principal underwriting process at 222, the automated merchant underwriting system can assign the merchant application a human underwriter at 224. For example, the automated merchant underwriting system can instruct the human underwriter to clear any pending conditions identified by the automated merchant underwriting system. This can include, for example, risk flags that were generated by the fraud engine in FIG. 4.

In some embodiments, the automated merchant underwriting system can perform a trade license verification of the merchant in which the automated merchant underwriting system determines whether a state license is active and in good standing through a state licensing board, in which the automated merchant underwriting system verifies a local license by analyzing online resources provided by the locality or contacting a local licensing authority, and/or in which the automated merchant underwriting system determines that a license is not required for certain trades in the particular location of the merchant and waives the licensing requirements. In some embodiments, the automated merchant underwriting system can determine that the merchant is associated with a local license and that a local licensing authority does not have an online verification tool and can, in response, approve the trade license verification for the merchant while automatically adding the merchant to a queue for a human underwriter to use commercially reasonable efforts to verify the local license information.

In some embodiments, the automated merchant underwriting system can perform a customer satisfaction review of the merchant in which the automated merchant underwriting system can conduct one or more searches on the merchant using publicly available sources, such as social media websites, news articles, etc. Examples of sources can include litigation sources to determine whether the merchant or its principals are currently involved in a pending litigation or to determine whether the merchant or its principals were involved in a closed litigation within a particular period of time (e.g., the last three years). In another example, the automated merchant underwriting system can review customer review websites to determine whether the merchant is associated with negative experiences or complaints. In continuing this example, the automated merchant underwriting system can determine whether there is a historical trend of poor customer service or sales practices based on the negative experiences or complaints from the customer review websites. In yet another example, the automated merchant underwriting system can perform one or more web searches to verify and/or determine the legitimacy of a merchant's business operations. In continuing this example, a lending partner can provide one or more keywords for inserting into one or more search queries associated with the merchant.

In some embodiments, the automated merchant underwriting system can perform a financial viability review of the merchant. For example, the automated merchant underwriting system can determine whether liens, judgements, charge-offs, bankruptcies, overall credit health information, and payment ability information are material to the approval of the merchant.

In some embodiments, the automated merchant underwriting system can complete a quality assurance review prior to making a final decision on the merchant application at 224. For example, the automated merchant underwriting system can place the merchant application along with the supporting underwriting information in a queue of a human underwriter. In continuing this example, if the human underwriter determines that a merchant follow-up is required to clear pending conditions (e.g., raised flags, missing information, unverified information, etc.) at 226, the merchant application can be further assigned to a merchant services manager that contacts the merchant to clear pending conditions on the merchant application at 228. If the human underwriter determines that any pending conditions have been cleared (e.g., raised flags, missing information, unverified information, etc.) at 226 and/or if the human underwriter determines that the merchant application meets the underwriting requirements at 130, the automated merchant underwriting system can approve the merchant application at 232.

For example, upon the merchant application receiving approval from the automated merchant underwriting system (e.g., including the fraud protection and fraud decision engine), the automated merchant underwriting system can transmit an approval notification (e.g., an approval email, an approval text message, etc.) to the merchant device at 232. In some embodiments, the approval notification can invite the merchant to begin the merchant onboarding process at 234. For example, the approval notification can include an invitation to access the merchant portal component in which the merchant device can submit transactions, access real-time reporting and analytics, manage users, view rate sheets and manage offer codes, check rebate status, view invoice and billing statements, and receive merchant training and support. In another example, the merchant onboarding process can include setting up ACH account information associated with the merchant.

It should be noted that, in some embodiments, the automated merchant underwriting system can deny the merchant application and transmit a notification to the merchant indicating that the merchant application has been denied. The notification, in some embodiments, can include an opportunity to appeal the denial of the merchant application in which the merchant application along with the request to appeal the denial can be automatically routed to a human underwriter, such as the human underwriter that reviewed the merchant application and the supporting underwriting information at 224 of FIG. 2.

Generally speaking, upon an approved merchant logging into the merchant portal component, the merchant portal component can send financing applications to customers, transact with customers, manage available offers and customize plans, generate reports, add and manage users, add and manage sublocations or branches, etc.

Figure 6:
FIG. 6 shows an illustrative example of a user interface that allows a merchant to search through multiple customers in accordance with some embodiments of the disclosed subject matter.
Figure 7:
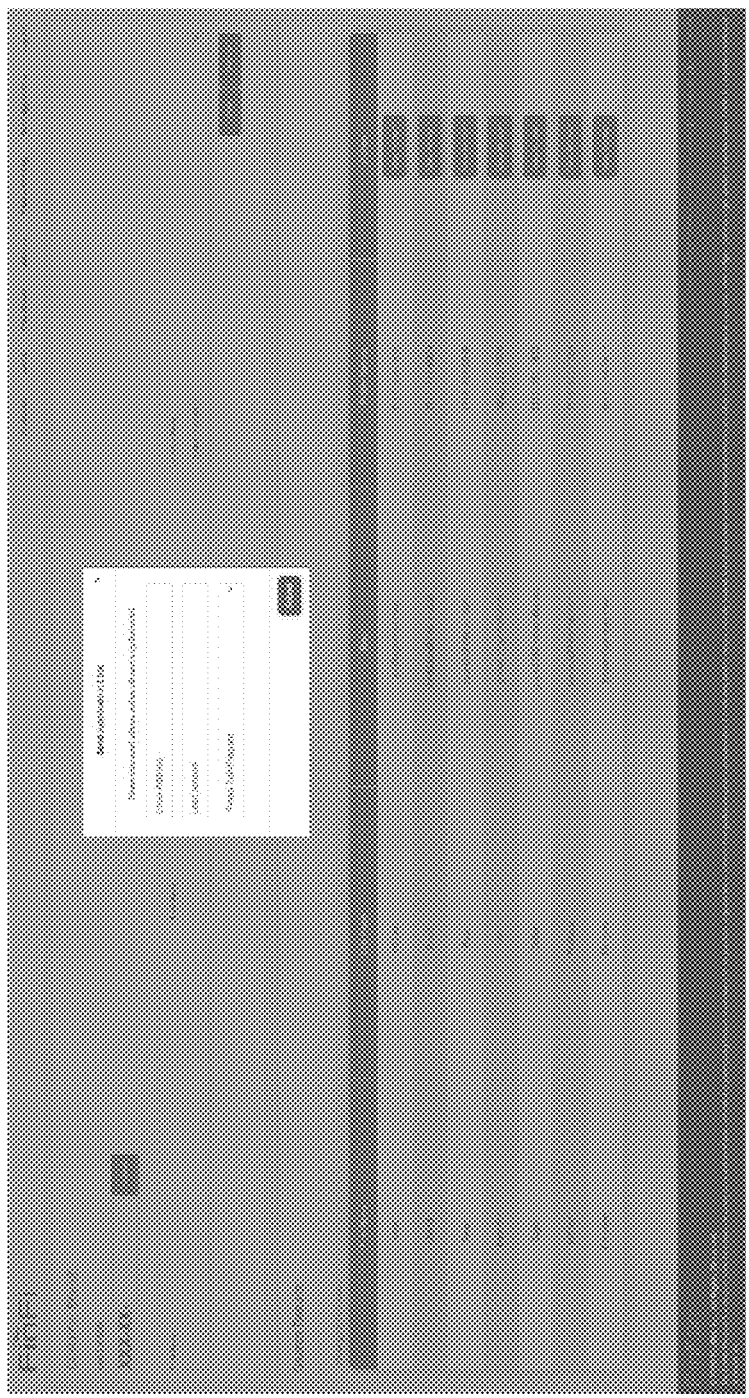
FIG. 7 shows an illustrative example of a user interface that allows a merchant to transmit a loan referral link for applying for financing in accordance with some embodiments of the disclosed subject matter.
Figure 8:
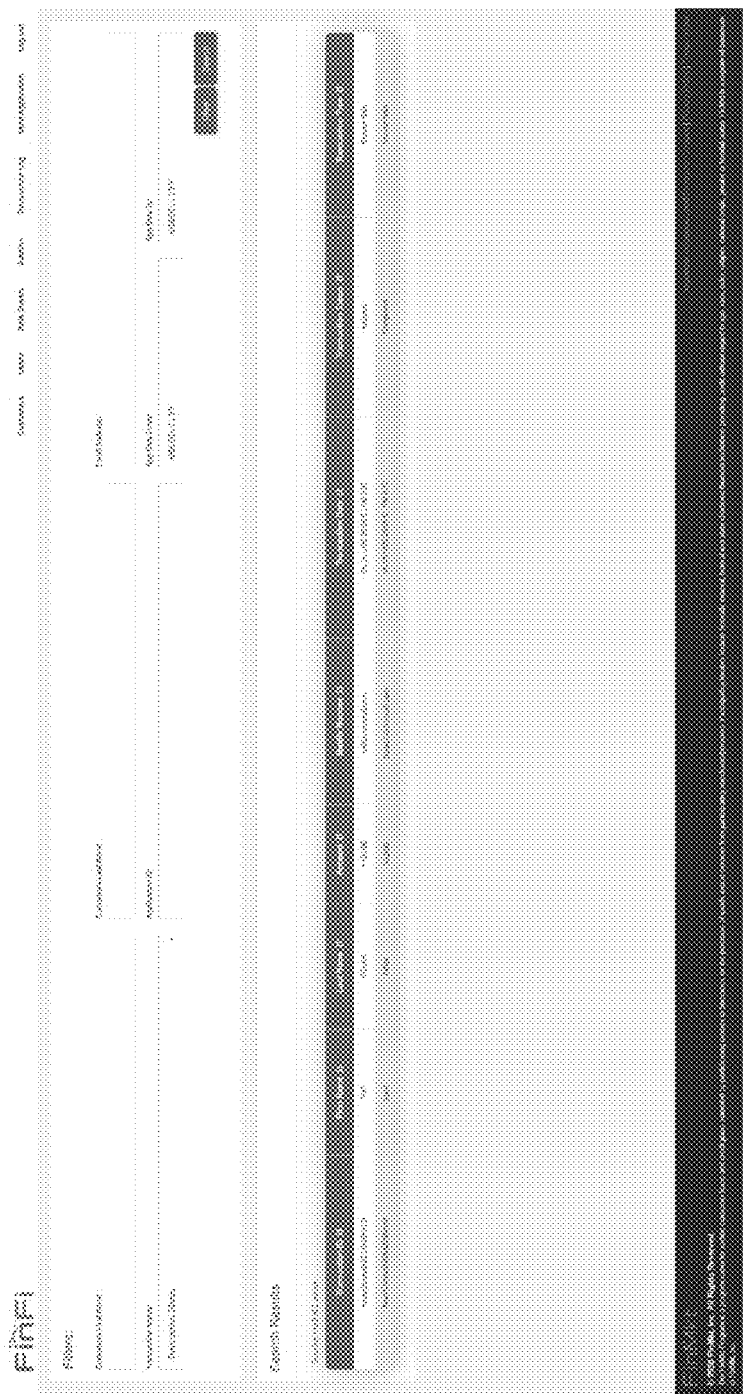
FIG. 8 shows an illustrative example of a user interface that allows a merchant to review customer search results based on inputted search criterion in accordance with some embodiments of the disclosed subject matter.
Figure 9:
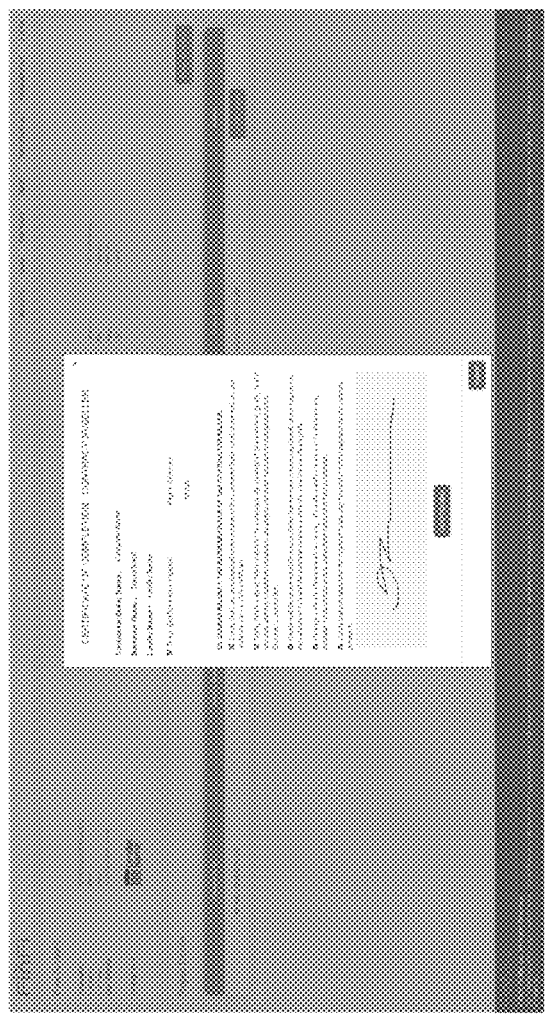
FIG. 9 shows an illustrative example of a certificate of completion for electronic signature by a merchant in accordance with some embodiments of the disclosed subject matter.
Figure 10:
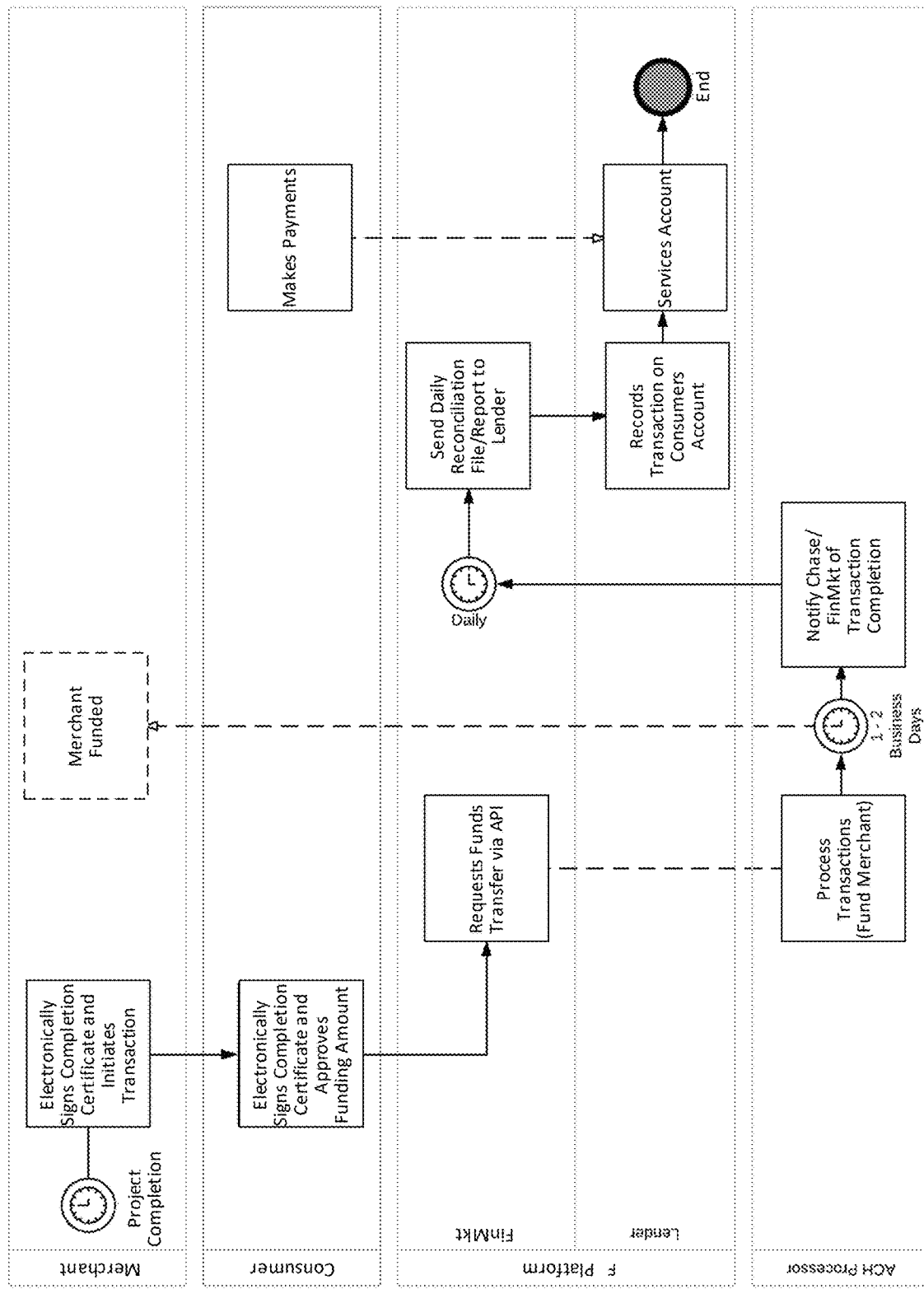
FIG. 10 shows an illustrative example of a process for electronically signing a completion certificate between a merchant and a consumer and funding the merchant in accordance with some embodiments of the disclosed subject matter.

For example, as shown in FIG. 6, a merchant can use the customer search page to search for and take action against a customer's account. As also shown in FIG. 6, search filters for performing a customer search can include first and last name, email address, mobile number, application status, merchant location, application date, application identifier, etc. In continuing this example, upon obtaining customer records returned in the search, the merchant can transact with a customer. For example, as shown in FIG. 7, the merchant can send an application link to a customer by inputting an email address, a project amount, an offer code, and/or a sub-program. In continuing this example, in response to submitting the application link, the merchant portal component can transmit a link to the customer that contains the merchant user and merchant location. In another example, as shown in FIG. 8, the merchant can review customer records returned in the search by, for example, transaction identifier, first name, last name, loan amount, mobile number, transaction date, transaction status, transaction type, etc. As shown in FIGS. 9 and 10, the merchant can electronically sign a completion certificate to initiate a transaction with the customer. FIG. 9 shows an illustrative example of a completion certificate that has been electronically signed by the merchant and in which the merchant has made particular certifications.

As shown in FIG. 10, in response to the merchant electronically signing the completion certificate and initiating the transaction with the customer, the merchant portal component can automatically transmit the completion certificate to the customer via the customer portal component, where the customer can be provided with the opportunity to electronically sign the completion certificate and approve the funding amount. Once the completion certificate has been signed by both the merchant and the customer, a request for funds from the lending partner can be transmitted. As also shown in FIG. 10, upon the merchant being funded, the point of sale platform can manage the transaction and receive payments from the customer. For example, upon submitting for payment, the customer can receive a text message or email with a link to the completion certificate, complete a one-time-passcode verification, confirm that the work has been completed, and electronically sign and authorize payment to the merchant.

In some embodiments, the merchant portal component can automatically assign a rate sheet template to the merchant based on a program (e.g., home improvement, ecommerce, auto, etc.) and/or based on a sub-program (e.g., roofing, HVAC, pools, landscaping, etc.). As used herein, a rate sheet can define the pricing structure of plans of the platform to either the merchant or the lender. Rate sheet templates can, for example, have attributes to which, using automation, can be automatically applied to a merchant with attributes that match the attributes of a specific rate sheet template. For example, rate sheet templates can include attributes, such as program and sub-program availability, pricing, and merchant attributes. For merchants, the pricing attributes on the rate sheet templates can have two sub-attributes, such as a transaction fee and a merchant fee. The rate sheet template can have default fee values than can be modified for a specific merchant once the rate sheet template has been copied and associated with a specific merchant account. The program and subprogram can define which programs and subprograms the rate sheet template is available. Merchant attributes, such as ASR and Years in Business, can help automation determine which rate sheet template a new merchant should receive. An illustrative example of a merchant product mix is shown in the table below.

Illustrative Example of a Merchant Product Mix

| Product Type | Description | Promotional Periods | Post Promotional Terms (Amortization Period) | Total Terms (Includes both Promo and Amortization Periods) |
| --- | --- | --- | --- | --- |
| Deferred Interest | Interest waived if loan paid in full within promotional period | 6, 12, 18 | 36, 60, 84 | 42, 72, 102 |
| Fixed Rate | Standard installment loan. Loan may carry interest only payments | 6 | 36, 60, 84 | 42, 66, 90 |
| Mixed Rate | Mixed APR's, for example, 0% for 12 months, followed by 9.99% for 36 months | 6, 12, 18 | 36, 60, 84 | 42, 72, 102 |

Figure 11:
FIG. 11 shows an illustrative example of a user interface that allows a merchant to create rate sheets, create offers, and configure merchant fees in accordance with some embodiments of the disclosed subject matter.

For example, FIG. 11 shows an illustrative example of a user interface in which the merchant can create one or more rate sheets. As shown in FIG. 11, the rate sheet can include a plan number, a plan description (e.g., 10.99% APR), a plan type (e.g., installment, revolving, etc.), a term (e.g., 120 months), a promo period (e.g., six month no-interest, no-payment), a merchant fee (e.g., 7.00%), etc.

It should be noted that each rate sheet can be activated or deactivated.

In some embodiments, a merchant can use the merchant portal component to create a pool of offers using offer codes. An offer generally refers to a custom grouping of available products. An offer can consist of one or more offers and can be limited to the availability of products within a merchant's rate sheet. By default, a merchant offer can be created that consists of all available products at the time of merchant approval. An offer code can be passed when facilitating consumer applications to validate the availability of the offer and ensure that correct offers are displayed to the consumer. Generally speaking, the ability to create offers can assist merchants with controlling the availability of their products. For example, a merchant may desire to only offer deferred interest products as part of a holiday weekend sales promotion. The combination of deferring interest over a 12-month promotional period, coupled with discounted offering discounts on merchant products goods and services may help to drive more sales volume.

As also shown in FIG. 11, from the rate sheet page, a merchant can use the merchant portal component to select an option to create an offer. The merchant portal component can allow the merchant to name the offer, create a code, and define the products to include in the offer. Once the new offer has been created, the merchant portal component can make the offer available for use. Alternatively, in some embodiments, the merchant can edit or deactivate the offer.

Figure 12:
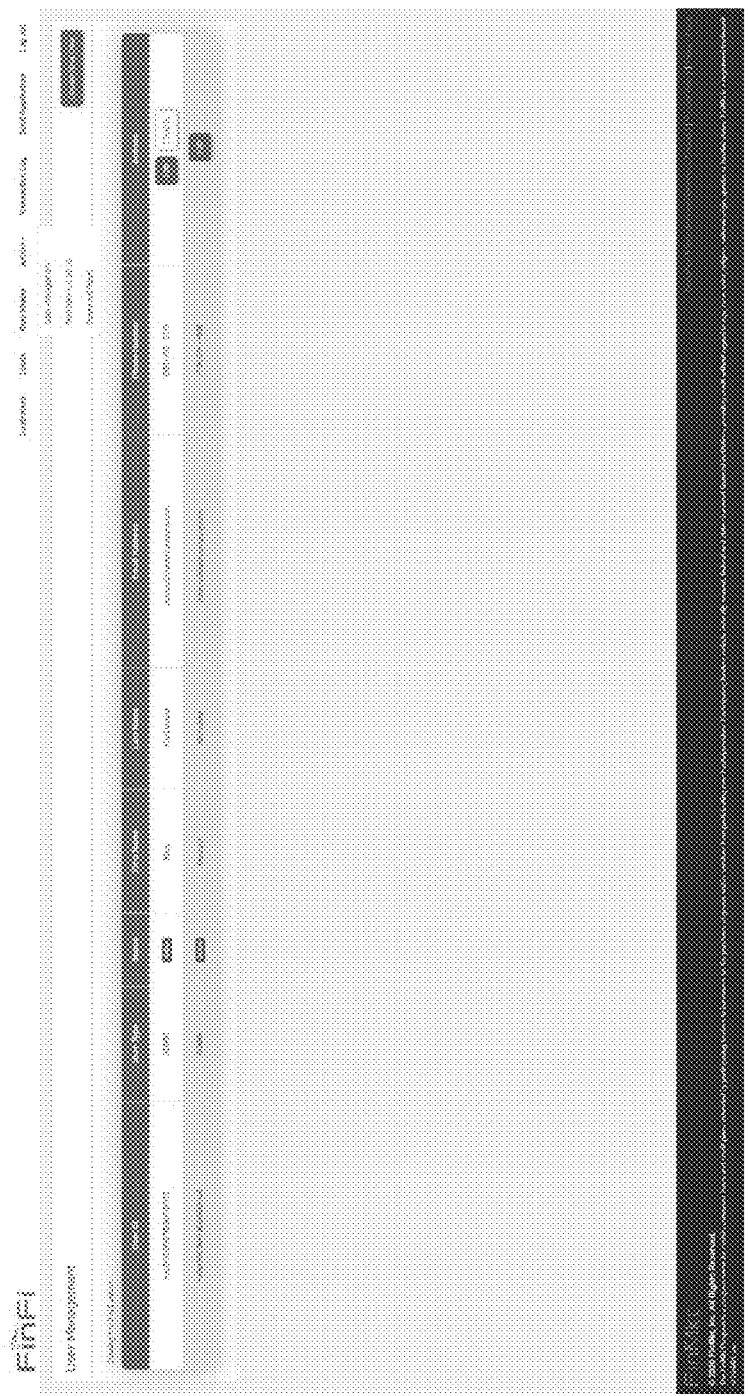
FIG. 12 shows an illustrative example of a user interface that allows a merchant to manage user accounts corresponding to a merchant account in accordance with some embodiments of the disclosed subject matter.

In some embodiments, upon merchant approval, the merchant applicant can become the primary administrator for the entire merchant account. As such, the user role can have full access to all platform types and objects such as a specific page within the user interface and any functionality associated with the page, such as adding a new user. In a more particular example, administrative users can update merchant information (e.g., phone number, email address, ACH payment information), can add and remove users, can add locations and configure specific location plans, etc. As shown in FIG. 12, the merchant portal component can allow new user accounts to be created through an administration page with each user account having a particular user type (e.g., administrator, view-only access, etc.).

Figure 13:
FIG. 13 shows illustrative examples of user interfaces for prescreening a customer without impacting the customer's credit in accordance with some embodiments of the disclosed subject matter.
Figure 14:
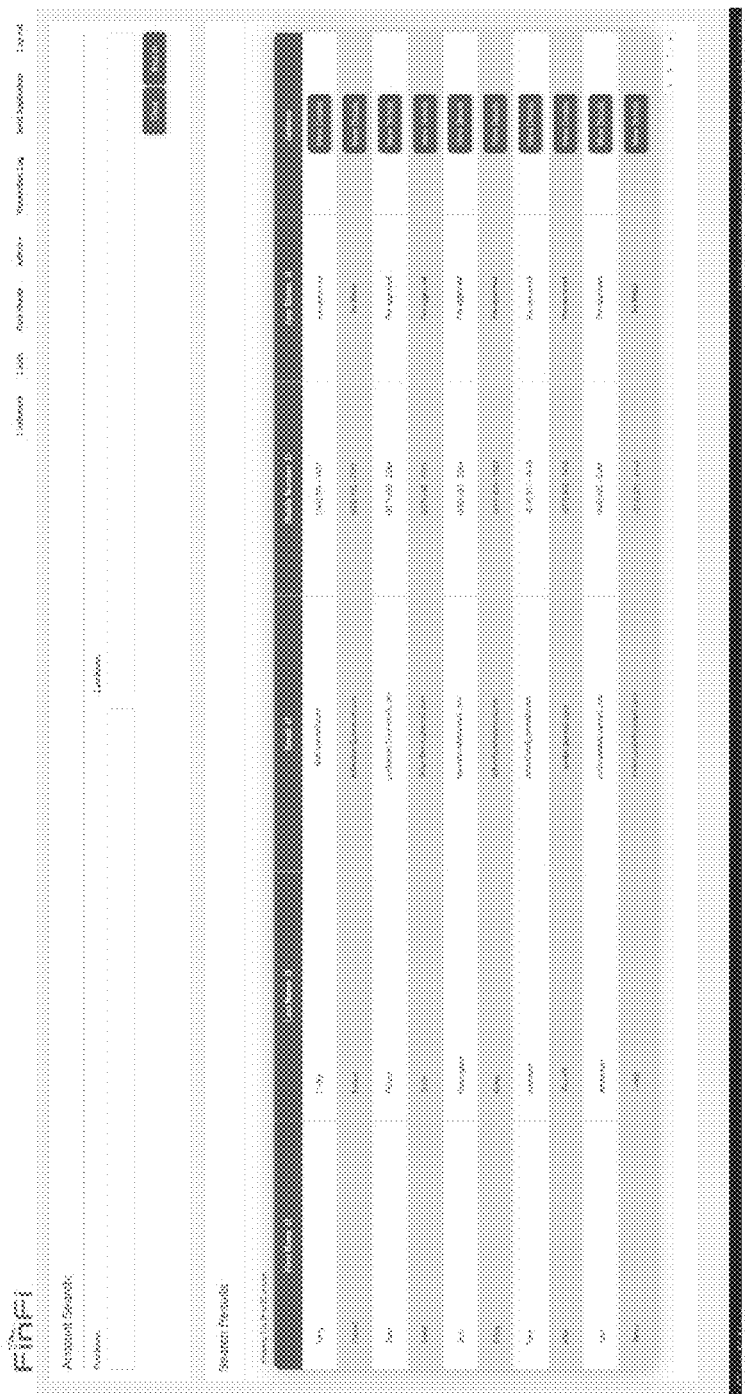
FIG. 14 shows an illustrative example of a user interface that allows a merchant to review leads of prequalified customers for offering financing in accordance with some embodiments of the disclosed subject matter.

In some embodiments, the merchant portal component of the point of sale platform can pre-screen leads for available financing programs, thereby allowing merchants to capitalized on qualified buyers quickly and efficiently. For example, as shown in FIG. 13, a user interface can be presented on a merchant website in which a potential customer can determine whether the potential customer may qualify for a financing program without submitting a full application. In response to one or more potential customers submitting the requested information from FIG. 13, the merchant portal component can store and present the potential customers and their associated information in a leads tab on the merchant portal component shown in FIG. 14.

Consumer Portal Component

In some embodiments, the mechanisms can include a consumer portal component. The consumer portal component can, for example, provide a consumer at a consumer device with access to approve transactions, view account history, and review loan details.

It should be noted that the consumer portal component can provide a consumer at a consumer device with the ability to complete and submit a consumer application and manage the consumer application. The consumer application can, for example, include a fraud protection and fraud decision engine, a credit decision engine, a multi-offer decision engine, and bank allocation engine. In some embodiments, the consumer application can initiate a transaction from within a consumer application. In some embodiments, the consumer application can include an electronic signature capture.

Figure 15:
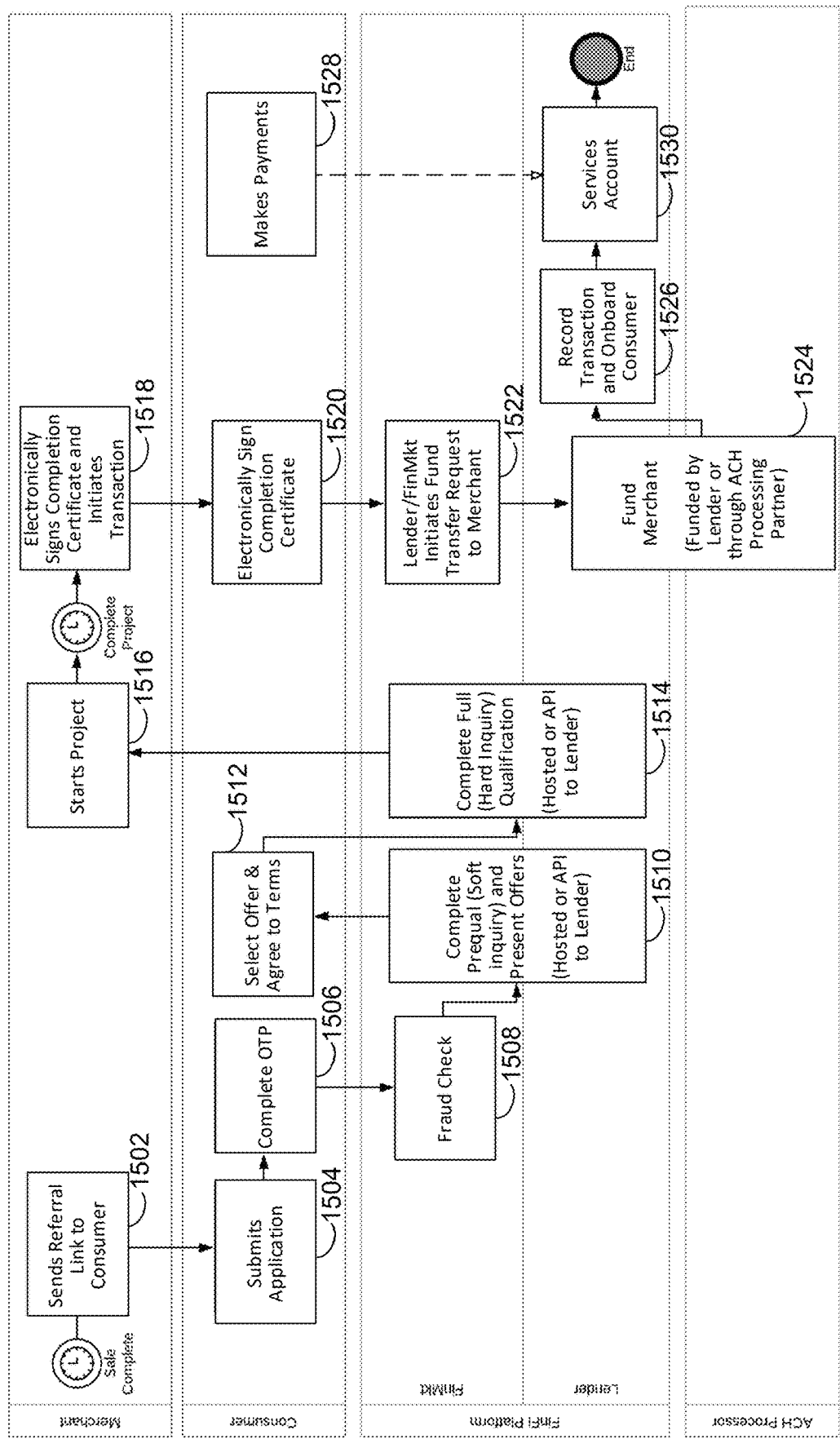
FIG. 15 shows an illustrative example of a process for submitting a consumer application, selecting an offer from multiple offers associated with multiple lending partners, and submitting the loan with the lending partner associated with the selected offer in accordance with some embodiments of the disclosed subject matter.

In some embodiments, the consumer portal component can begin, at 1502 of FIG. 15, by allowing an approved merchant at a merchant device to send a consumer application to the consumer via the merchant portal component. In some embodiments, in instances in which the merchant offers financing to the consumer as an option to pay for goods or services, the merchant can initiate the consumer application with the consumer by, for example, linking the merchant website to the consumer application, using a merchant application that communicates with the consumer application via an application programming interface. As described above in connection with FIG. 7, the merchant can transmit an application link or a loan referral link to the customer by inputting an email address and a project amount and by clicking the submit button.

Figure 16:
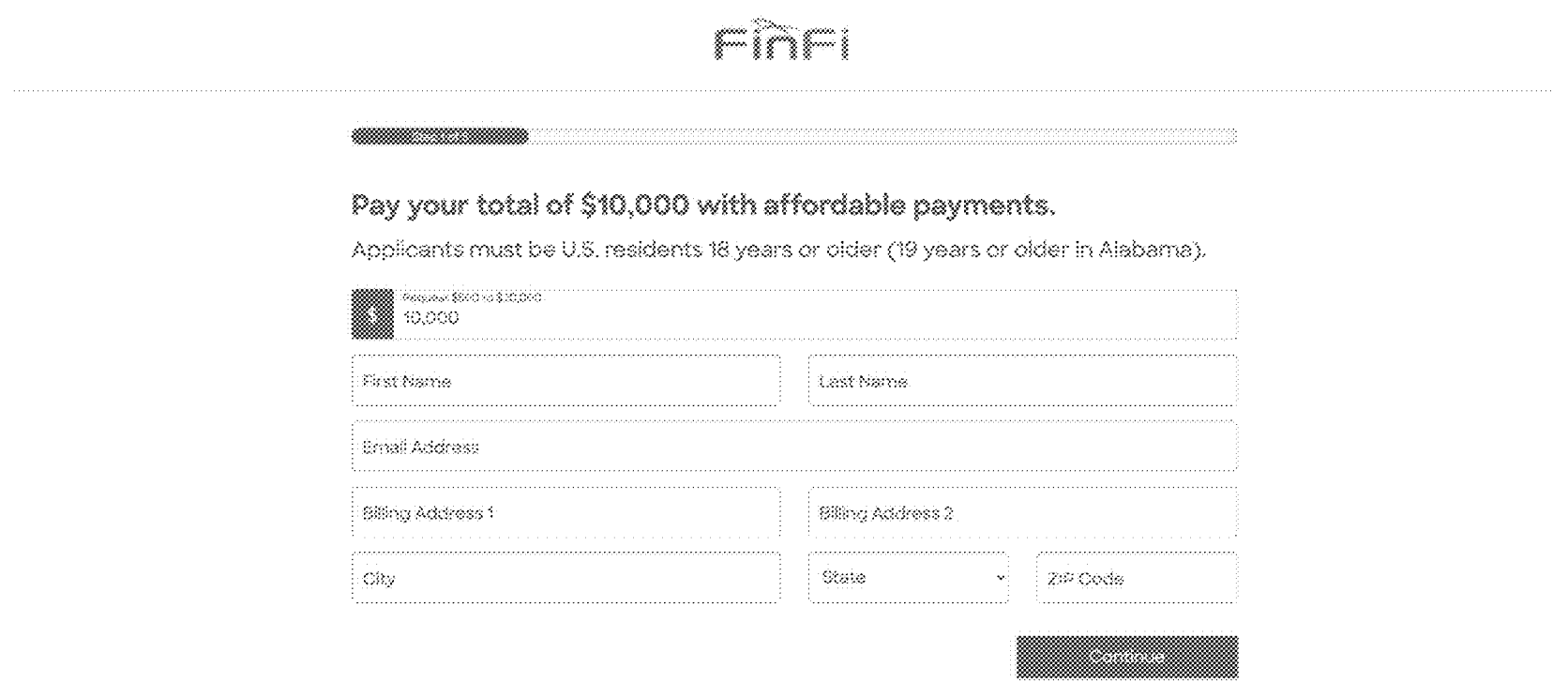
Figure 17:
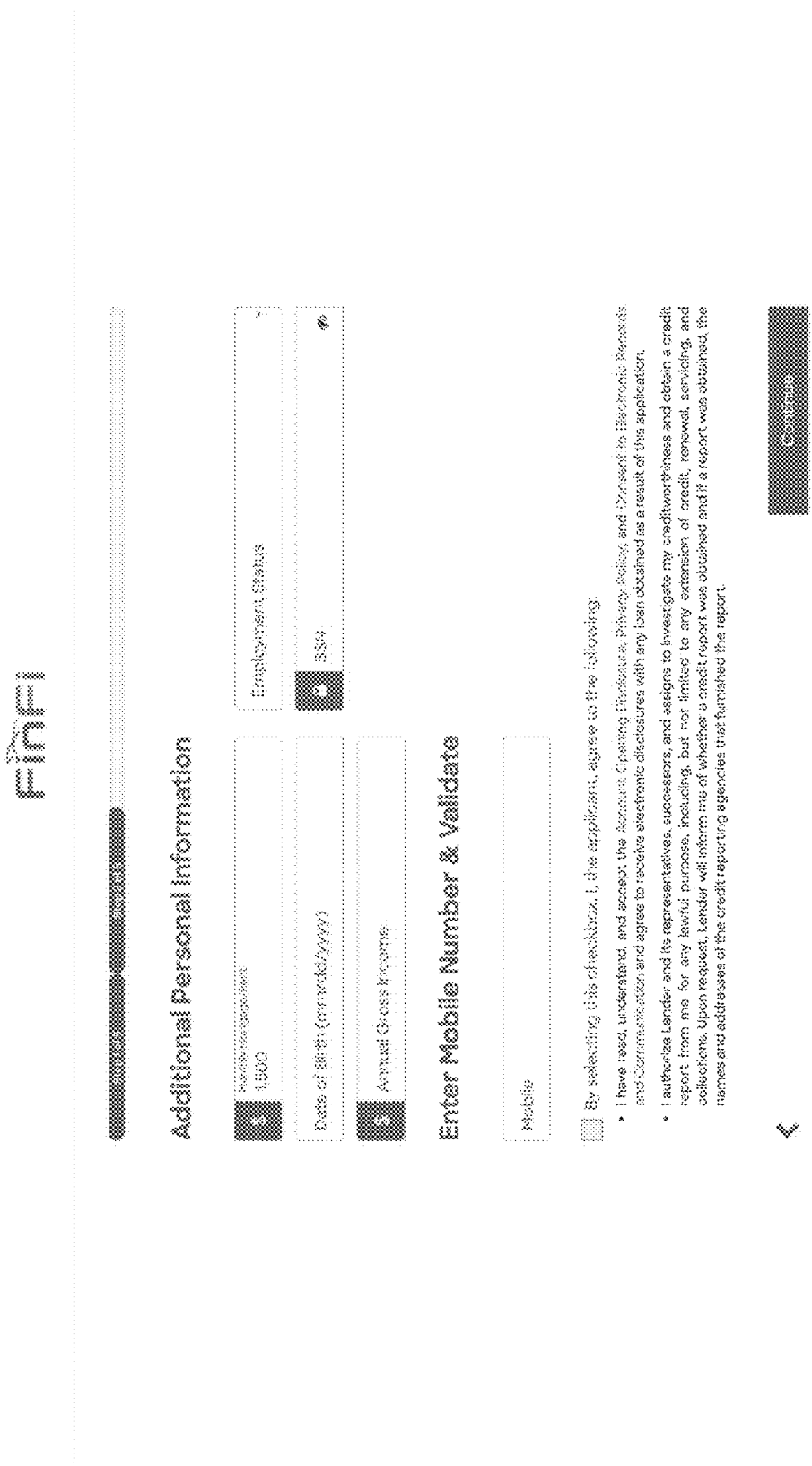

After selecting the link, the customer can be prompted to confirm the loan amount and begin filling out the application. An illustrative example of user interfaces that are presented in response to selecting the link is shown in FIGS. 16 and 17. As shown in FIG. 17, the consumer portal component can request that the consumer enter monthly rent/mortgage payment information, phone number, date of birth, social security number, annual gross income, etc.

It should be noted that, in some embodiments, the consumer portal component can include a pause and resume functionality with regard to consumer information. Generally speaking, lenders may be specific as to what consumer is needed from a consumer prior to presenting an offer from a lender. For example, some lenders may accept stipulations as to annual income while other lenders may require bank account information from the consumer prior to presenting an offer. In continuing this example, the consumer portal component can identify lenders based on waterfall entitlement and, once knowledgebase filtering has been done, the consumer portal component can store the lender information to understand which consumer information is required by each lender. The consumer portal component can determine which information the consumer has provided and can pause the waterfall to present a different version of offers if the next lender in the waterfall requires a different set of consumer information that has not been provided by the consumer. Upon determining that the consumer has provided the additional consumer information, the consumer portal component can resume the lender waterfall and update the presented offers as described hereinbelow.

In some embodiments, the consumer portal component can automatically pre-populate a consumer application for existing users of the consumer portal component. For example, in response to logging in (e.g., using a mobile phone number, using a username and password, etc.), the consumer portal component can request any additional consumer information needed to provide loan offers (e.g., updated income information). In another example, in response to authenticating when receiving a loan referral link from a merchant website, the consumer portal component can automatically transmit consumer information, assess the credit profile of the consumer, and proceed towards prequalifying for a maximum amount after lenders assess their credit profile, thereby allowing them to increase their purchase if desired.

In some embodiments, in response to the consumer completing and submitting the consumer application, the consumer portal component can use a fraud protection and fraud decision engine to review the consumer application for fraud by performing a fraud check. For example, the fraud protection and fraud decision engine can determine whether to reject the consumer application based on the fraud check.

Figure 18:
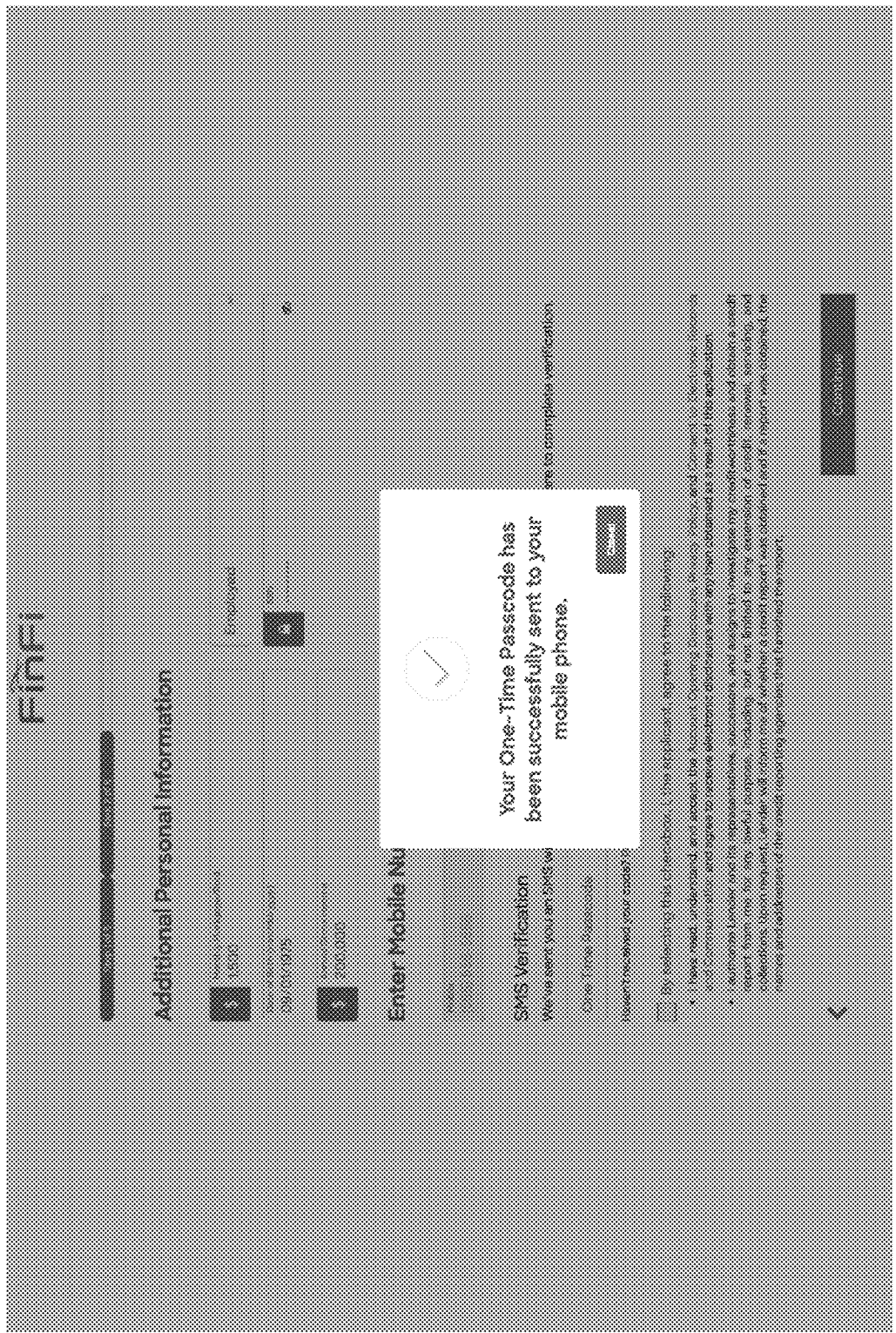
FIG. 18 shows an illustrative example of a user interface for transmitting a one-time passcode to a mobile computing device associated with the consumer in accordance with some embodiments of the disclosed subject matter.

Referring back to FIG. 15, at 1506, the consumer portal component can verify the identity of the consumer using a one-time passcode and validation using a mobile device of the consumer. It should be noted that the consumer may be required to verify their identity using the one-time passcode before being presented with one or more lending offers. For example, as shown in FIG. 18, the consumer portal component can transmit a one-time passcode to the consumer at the consumer device information provided in the consumer application (e.g., a mobile phone number). In another example, if the consumer portal component is unable to verify the identity of the consumer via the one-time passcode, the consumer portal component can prompt the consumer to provide additional identification information to verify the identity of the consumer (e.g., transmit a photo identification card associated with the consumer).

At 1508, the consumer portal component can perform a fraud check to assist with verifying consumer identity and fraud mitigation. For example, similar to the merchant identification and merchant fraud check described in connection with FIG. 2, the consumer portal component can use name, physical address, phone number, email address, IP address, geolocation information, and other personal information to confirm the identity of the consumer. This can also, for example, determine an extent that the consumer poses any potential fraud risk. In another example, the fraud check can include searching across multiple online data sources to obtain portions of a composition of the consumer's digital identity. Upon determining that a threshold amount of information has been received or that a particular period of time has elapsed, the consumer portal component can provide the snapshot of the consumer's digital identity to a fraud learning model that provides an output indicating a probability that the identity of the consumer is authentic.

Figure 19:
FIG. 19 shows an illustrative example of a user interface for presenting multiple offers from multiple lending partners in accordance with some embodiments of the disclosed subject matter.

At 1510, in response to receiving the submitted consumer application, verifying the identity of the consumer and completing the fraud check, the consumer portal component can use a credit decision engine to perform a soft credit pull at 1512 and to determine which offers match the requirements for both the consumer and the one or more lenders. In response to determining that the consumer is creditworthy as qualifying for credit, the consumer portal component can use a multi-offer decision engine to determine and present matching offers to the consumer at 1512. An illustrative example of a user interface in the consumer portal component that presents one or more matching offers to the consumer is shown in FIG. 19. As shown in FIG. 19, the user interface can present the consumer with an indication that the consumer is creditworthy to receive multiple offers from multiple lenders, can present the loan details for each offer, and can provide the consumer with an opportunity to accept one of the matching offers.

It should be noted that, in some embodiments, the consumer portal component can perform multiple soft credit pulls concurrently. For example, the consumer portal component can perform an internal soft credit pull and an external soft credit pull, where each soft credit pull can be analyzed to determine which offers match the requirements. In another example, the consumer portal component can perform an internal soft credit pull as approved by a first set of lenders and multiple external soft credit pulls corresponding to a configuration from each of a second set of lenders. In continuing these examples, multiple offers from multiple lenders can be created by aggregating the offers for presenting to the consumer.

In some embodiments, the multi-offer loan engine determines multiple offers for the consumer based on the offer code configuration at the merchant level as well as the availability of lenders willing to originate against the different promotional financing options available through the offer code. It should be noted that, in some embodiments, the multi-offer loan engine can determine the approved loan amount based on factors including income, FICO score, debt-to-income ratio, etc. In continuing this example, each lender can configure one or more line assignment policies can be applied when determining the loan amount for an approved consumer applicant.

In some embodiments, the multi-offer loan engine can present the consumer with the best offers that match the requirements for both the consumer and the lender. Alternatively, the multi-loan engine can present the consumer with every available offer that matches the requirements for both the consumer and the lender (for example, when a consumer may be eligible for a higher loan amount but is interested in receiving a loan for a lesser amount).

Figure 30A:
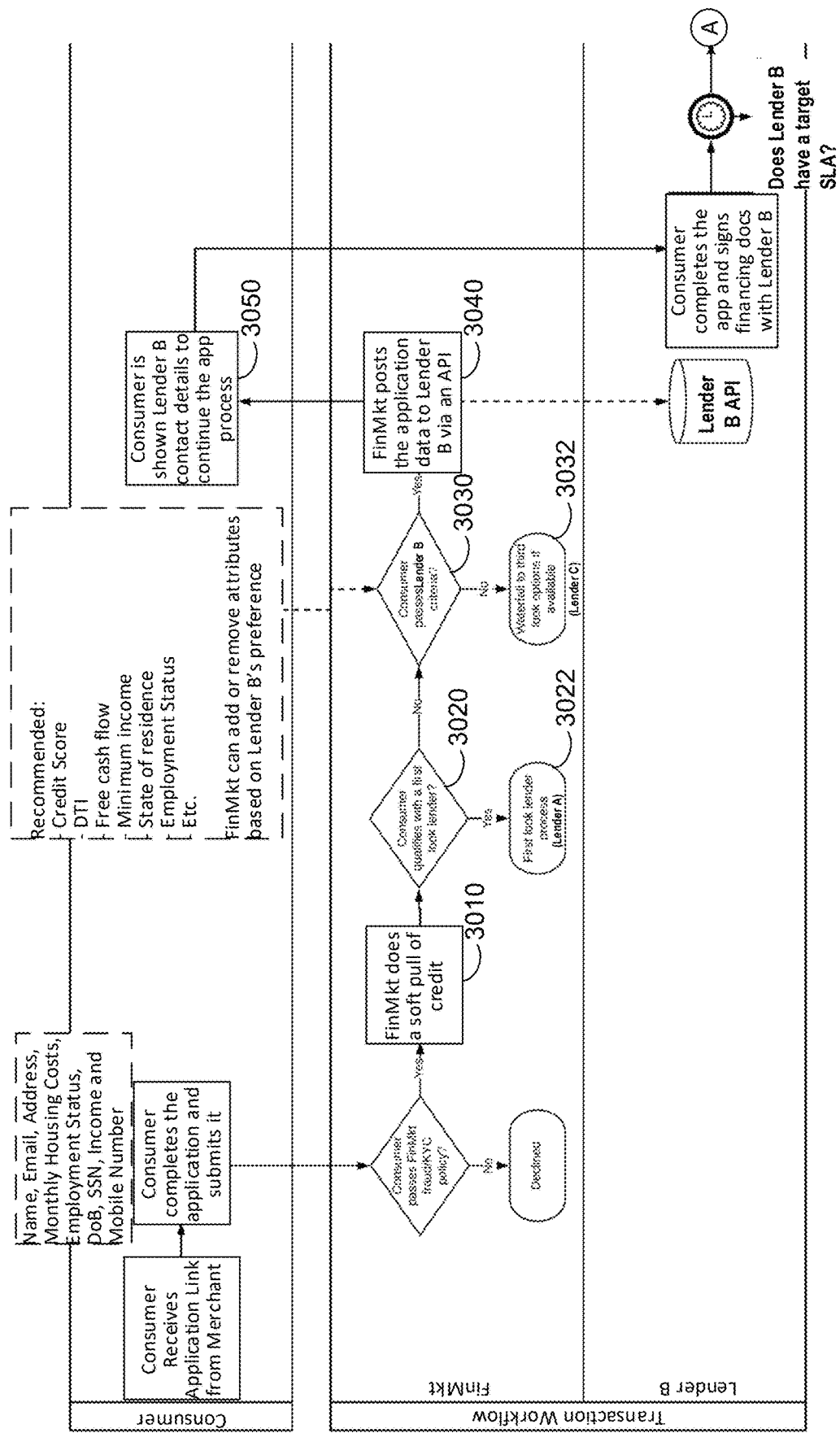
FIGS. 30A and 30B show an illustrative example of a consumer application process that includes lender waterfalling features in accordance with some embodiments of the disclosed subject matter.
Figure 30B:
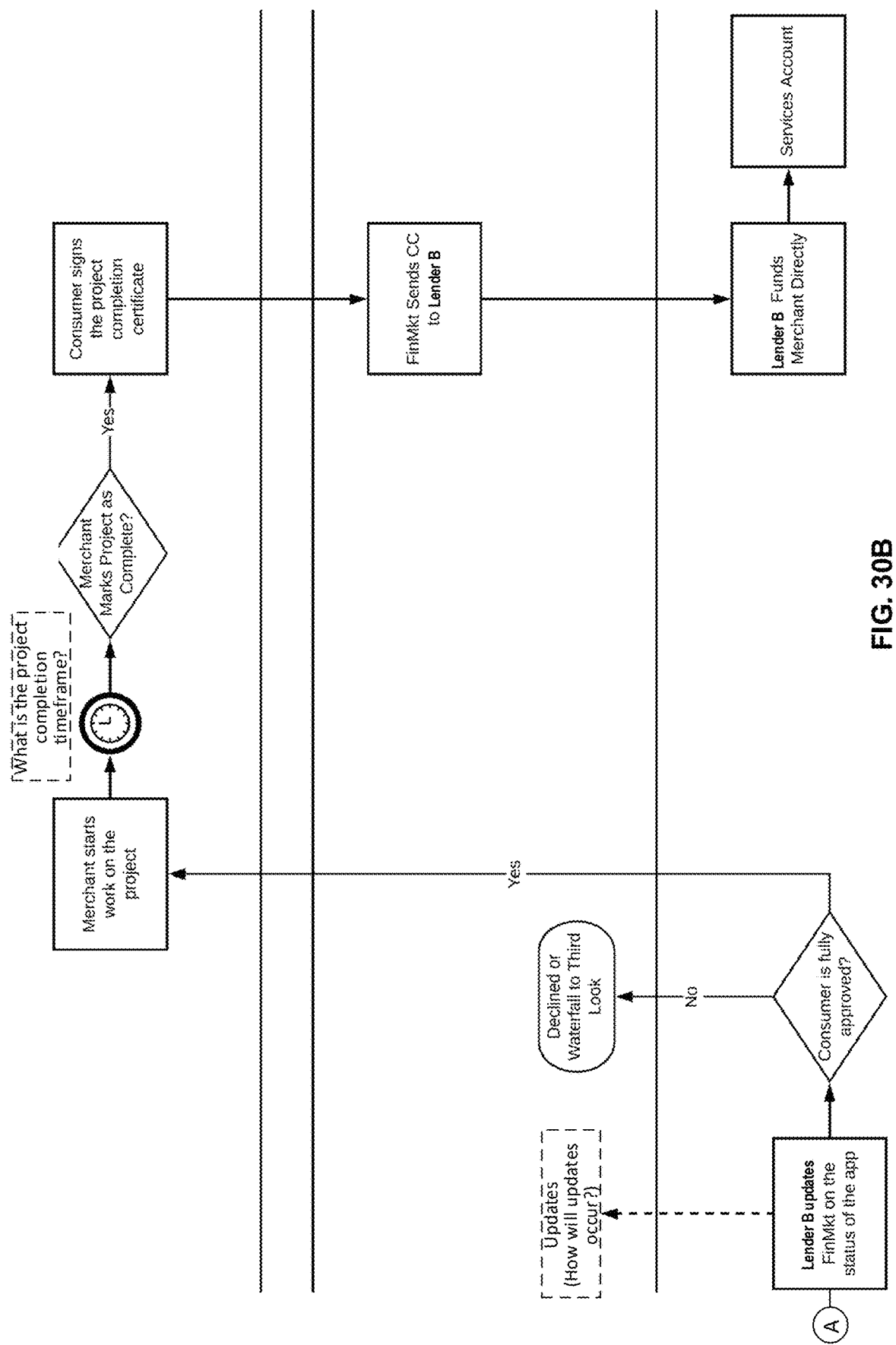

In some embodiments, as shown in FIGS. 30A and 30B, after determining that the consumer is creditworthy based on the one or more soft credit pulls at 3010, the multi-offer loan engine can determine whether the consumer qualifies with a first look lender at 3020. For example, in response to determining that the consumer has provided sufficient consumer information and has been presented with suitable disclosures in accordance with the lending requirements of a first look lender, the multi-offer loan engine can proceed to determining matching offers from the first look lender at 3022. In continuing this example, the matching offers from the first look lender can be presented to the consumer at the consumer device in making a purchase from an approved merchant (e.g., on a merchant page, at a merchant location, etc.).

It should be noted that, although the embodiments described herein, generally refer to a first look lender, this is merely illustrative. The multi-offer loan engine can determine that the consumer has provided sufficient consumer information and has been presented with suitable disclosures in accordance with the lending requirements of multiple lenders. For example, multiple first look lenders having similar lending requirements may accept a general disclosure that is automatically presented to the consumer prior to receiving any loan offers and may accept a common set of consumer information from the submitted application.

It should also be noted that, in response to determining that the consumer has provided sufficient consumer information and has been presented with suitable disclosures in accordance with the lending requirements of the first look lender, the multi-offer loan engine can pause or otherwise be inhibited from determine whether the consumer may receive offers from one or more second look lenders.

Returning to FIGS. 30A and 30B, in response to determining that the consumer has not qualified for loan offers from the first look lender, the multi-offer loan engine can resume searching for offers to present to the consumer by determining whether the consumer qualifies with a second look lender at 3030. For example, in response to determining that the consumer has provided sufficient additional consumer information (e.g., credit score, debt-to-income ratio, free cash flow, minimum income, state of residence, employment status, etc.) and has been presented with different disclosures in accordance with the lending requirements of a second look lender, the multi-offer loan engine can proceed to determining matching offers from the second look lender at 3040. In continuing this example, the matching offers from the second look lender can be presented to the consumer at the consumer device in making a purchase from an approved merchant (e.g., on a merchant page, at a merchant location, etc.) at 3050.

In some embodiments, as shown in FIGS. 30A and 30B, in response to determining that the consumer has not passed the lender criteria for receiving loan offers from the second look lender at 3030, the multi-offer loan engine can continue to resume the search for offers to present to the consumer by waterfalling to determine whether the consumer qualifies with a third look lender at 3032.

It should be noted that, in some instances, the consumer application for receiving one or more financing offers can be denied for various reasons. As such, the consumer portal component of the point of sale platform can include adverse action notice features. For example, the point of sale platform can issue adverse action notices to consumers in the loan origination process on behalf of a lending partner.

Figure 31A:
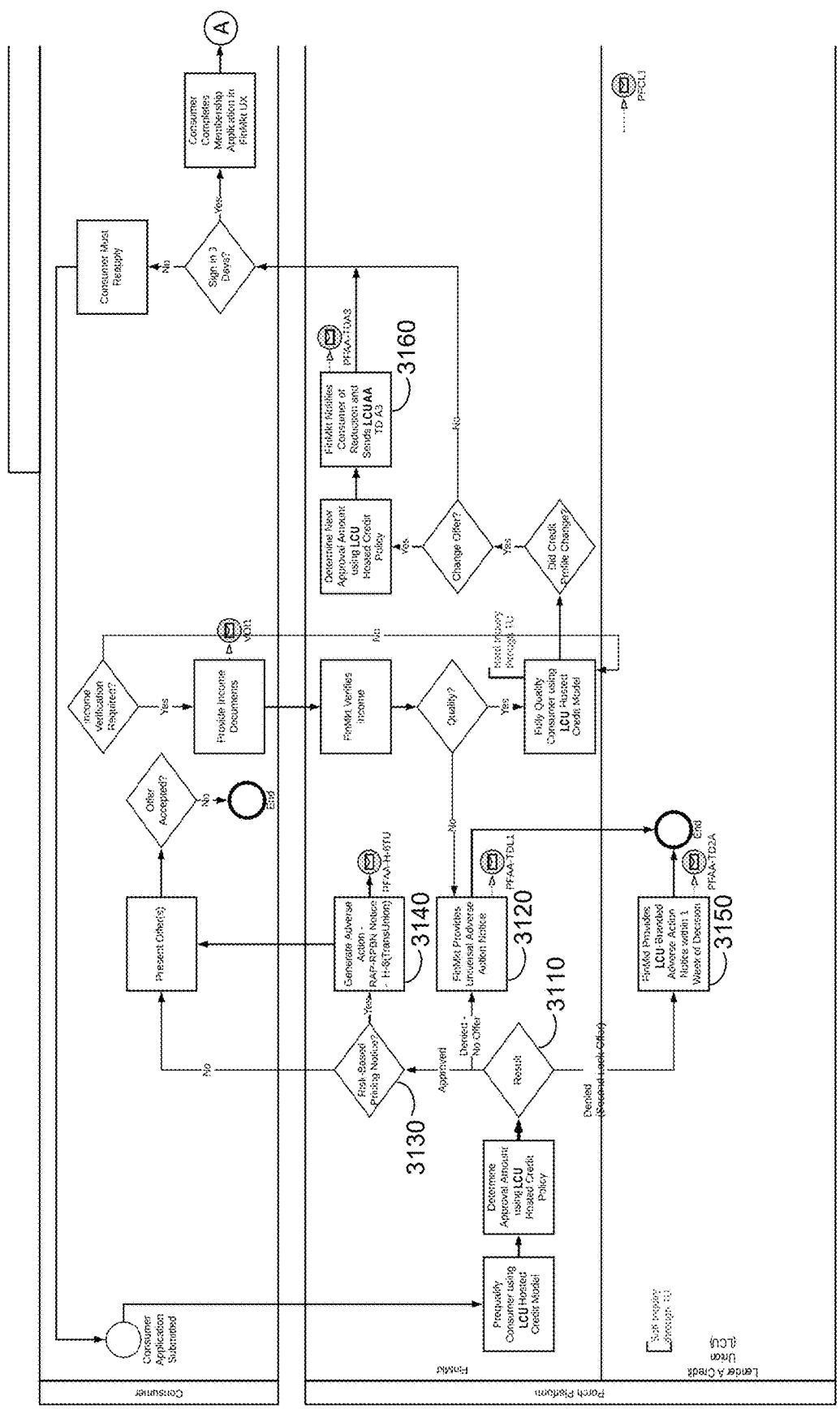
FIGS. 31A and 31B show an illustrative example of a consumer application process that includes adverse action notice features in accordance with some embodiments of the disclosed subject matter.
Figure 31B:
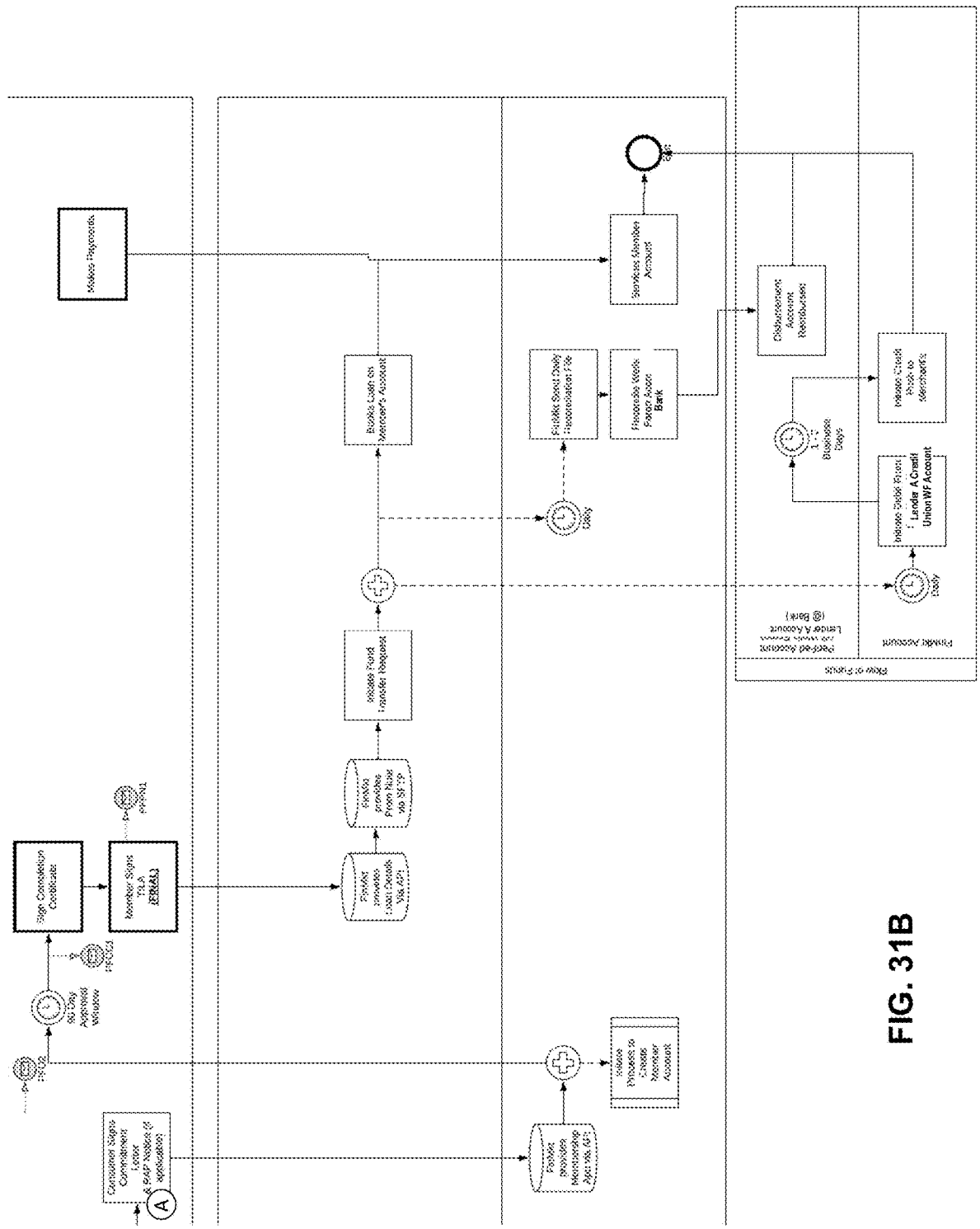

Turning to the illustrative process shown in FIGS. 31A and 31B, the consumer portal component can determine whether the consumer prequalifies for one or more loan offers (e.g., based on one or more soft credit pulls) and can determine a loan approval amount based on a credit policy at 3110.

In response to determining that the multi-offer loan engine has not found any matching offers at 3110, the consumer portal component can automatically generate an adverse action notice that includes an electronic disclosure indicating the reasons why the consumer application has been denied at 3120. This can, for example, be presented on the display of the application executing on the mobile computing device used by the consumer and transmitted via email to an email address associated with the consumer.

In response to determining that the multi-offer loan engine has found matching offers at 3110 but that risk-based pricing applies at 3130, the consumer portal component can automatically generate an adverse action notice that includes an electronic disclosure indicating the reasons why the consumer that submitted the consumer application has been approved but is receiving less favorable loan terms at 3140. This can, for example, be presented on the display of the application executing on the mobile computing device used by the consumer and transmitted via email to an email address associated with the consumer. It should be noted that risk-based pricing at 3130 may apply when a lender offers different interest rates and loan terms to the consumer based on the consumer's creditworthiness. As such, the adverse action notice that has been electronically delivered to the consumer can indicate that the consumer is receiving less favorable loan terms because of information in the credit report of the consumer.

As described above, in response to determining that the consumer has not qualified for loan offers from the first look lender, the multi-offer loan engine can resume searching for offers to present to the consumer by determining whether the consumer qualifies with a second look lender (e.g., see 3030 of FIGS. 30A and 30B). In response to determining that the consumer has not qualified for matching offers from the second look lender at 3110, the consumer portal component can automatically generate an adverse action notice on behalf of the second look lender that includes an electronic disclosure indicating the reasons why the consumer application has been denied at 3150. This can, for example, be presented on the display of the application executing on the mobile computing device used by the consumer and transmitted via email to an email address associated with the consumer. In some embodiments, the adverse action notice can be branded with identifiers associated with the second look lender to indicate that the adverse action notice was generated on behalf of the second look lender.

Otherwise, the consumer portal component can present the consumer with multiple offers from multiple lending partners for selection in a single interface.

Figure 20:
FIG. 20 shows an illustrative example of a user interface for verifying the loan summary of a selected offer and confirming that a hard credit pull is authorized in accordance with some embodiments of the disclosed subject matter.

In response to selecting an offer (e.g., selecting "$863/Mo. for 12 months @ 6.49% APR" and selecting the "Accept" button), the consumer portal component can provide the user with one or more confirmation interfaces, such as the one shown in FIG. 20. This can also, for example, indicate to the consumer that a hard credit pull will be performed upon confirming interest in the loan product. Referring back to FIG. 15, the consumer portal component of the point of sale platform can perform a credit check (e.g., a hard credit pull) at 1514.

It should be noted that, in some embodiments, the hard credit pull can be performed by the point of sale platform. Alternatively, the lender can configure whether the point of sale platform or another entity performs the hard credit pull (e.g., based on a configuration setting from the lender).

Figure 21:
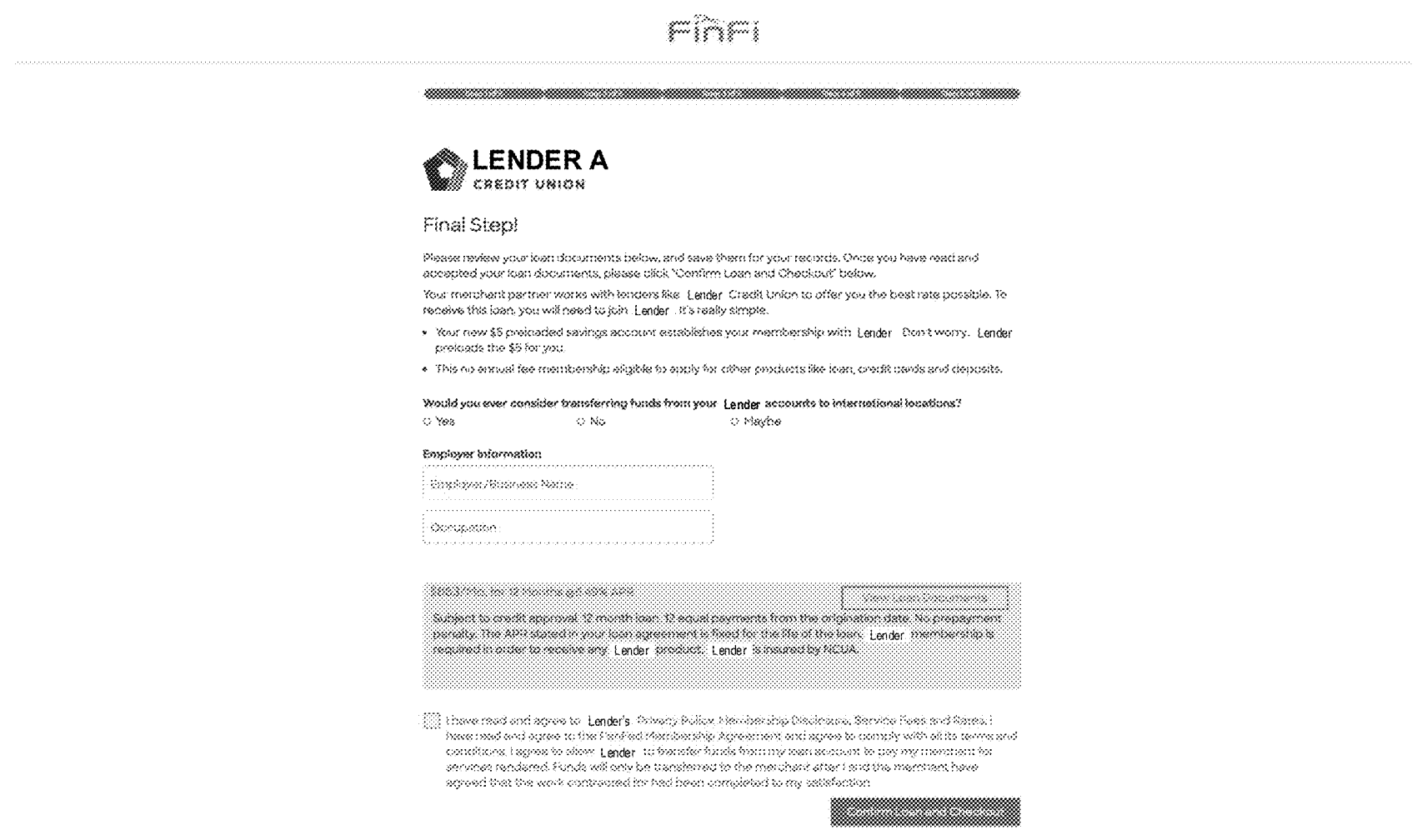

In some embodiments, when the lender is a credit union, the consumer portal component can automate the memberization process in which consumers may be required to become a member of the credit until prior to making a loan. For example, as shown in FIG. 21, a user interface of the consumer portal component can present the consumer with an opportunity to become a member of the credit union. In a more particular example, as shown in FIG. 21, the consumer can approve the opening of a savings account with the credit union in which a particular funding amount is needed to be placed within the savings account (e.g., five dollars). In continuing this example, the consumer upon authorizing the creation of the savings account with the credit union, no further interaction with the credit union may be required by the consumer.

Figure 22:
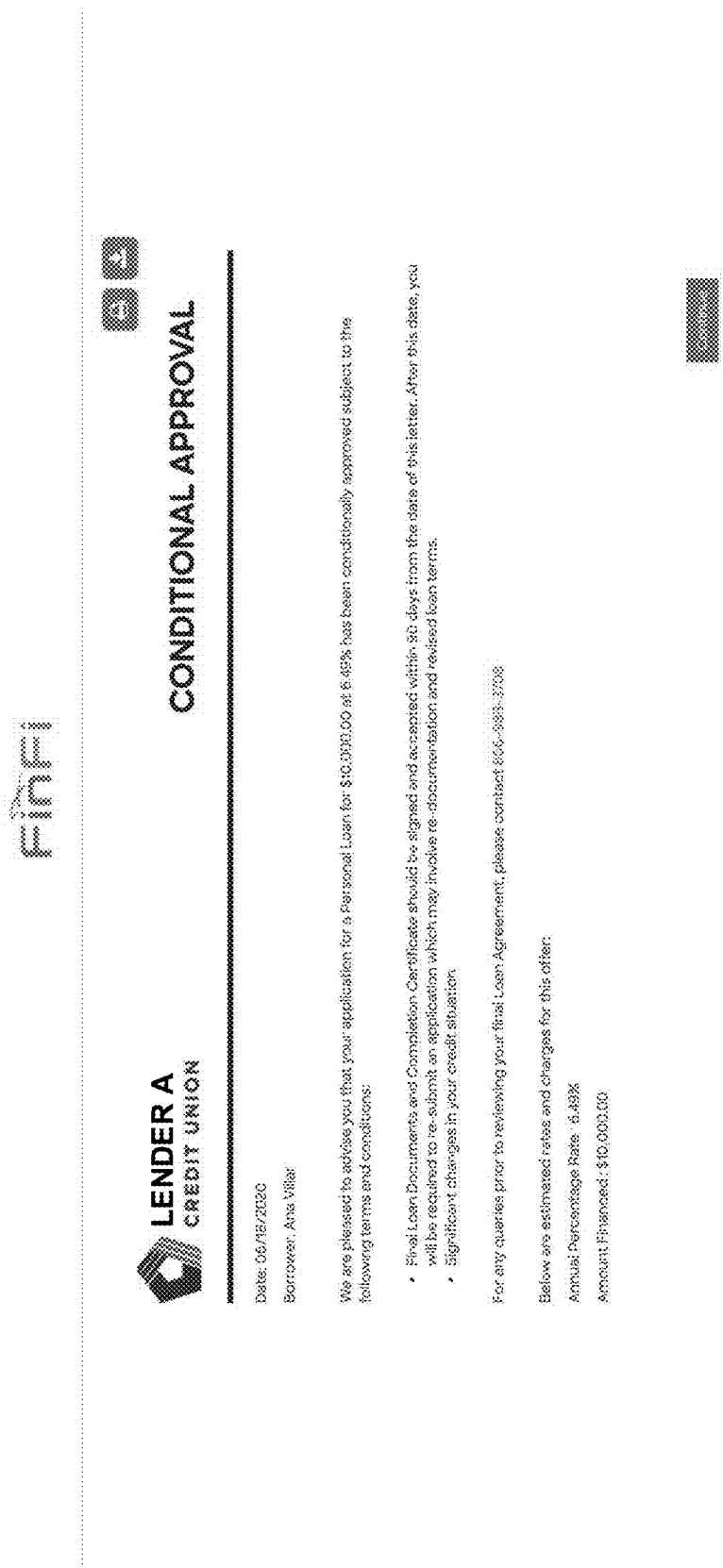
FIG. 22 shows an illustrative example of a user interface for conditional approval in which additional loan documents are transmitted to the consumer (e.g., via a different mechanism than the user interface) in accordance with some embodiments of the disclosed subject matter.

Once the hard credit pull has been completed at 1514 and once the consumer application has been approved, the project can begin at 1516. Upon performing the credit check and approving the consumer application, the consumer portal component can receive an indication from the lender device indicating that a lending account on behalf of the consumer has been established, the lending account has been funded, and/or providing additional loan or funding details. For example, as shown in FIGS. 22 and 23, the consumer portal component can provide a conditional approval indication in which additional electronic signatures to financing documents are needed. In response, the consumer portal component can provide the consumer with a loan confirmation screen that includes details of the lending account that has been funded by the lender. In some embodiments, the details of the lending account that has been funded by the lender can be transmitted to the consumer using one or more notification modes (e.g., email, text message, mobile notification, etc.). The merchant can receive the funds in real-time to complete the purchase.

In some embodiments, after the hard credit pull has been completed at 1514, the consumer portal component can determine that the credit profile of the consumer has changed. For example, as shown in FIGS. 31A and 31B, the consumer portal component can automatically update the presented loan offers and determine an updated approval amount. In a more particular example, in response to determining that the creditworthiness of the consumer has decreased (e.g., additional flags on a recent credit report associated with the consumer), the consumer portal component can determine an updated approval amount and transmit a notification to the consumer at 3160 of the reduction and the reasons why the reduction was made (e.g., based on the credit report of the consumer).

In some embodiments, the consumer portal component can include a pause and resume functionality with regard to presenting disclosures. Generally speaking, lenders may be specific as to what disclosures are accepted by a consumer prior to presenting an offer from a lender. For example, some lenders may accept a normalized disclosure to be presented, while other lenders may require that particular disclosures be presented to the consumer prior to presenting an offer. In continuing this example, the consumer portal component can identify lenders based on waterfall entitlement and, once knowledgebase filtering has been done, the consumer portal component can store the lender information to understand which disclosures are required by each lender. The consumer portal component can determine which disclosures the consumer has consented to and can pause the waterfall to present a different version of offers if the next lender in the waterfall requires a different set of disclosures that has not been presented or consented to by the consumer. Upon determining that the consumer has received and has consented to the additional disclosures, the consumer portal component can resume the lender waterfall and update the presented offers.

In some embodiments, in instances in which the consumer at the consumer device accesses a merchant website and selects to apply for financing, the details of the lending account that has been funded by the lender can be tokenized and passed to the merchant website. The token can, for example, allow the consumer to purchase goods or services available on the merchant website up to a given credit limit associated with the lending account. In continuing this example, when purchasing goods or services available on the merchant website, the consumer can be provided with the opportunity to pay using the newly funded lending account among other payment methods. In response to selecting the newly funded lending account, the mechanisms can transfer the funds from the lending account associated with the consumer to the merchant account. The consumer can, for example, receive a transaction confirmation screen.

In some embodiments, in instances in which the consumer originates through a referral partner or a distribution network, the consumer portal component can allow the consumer to spend with one or more merchants associated with the referral partner or within the distribution network.

Figure 28:
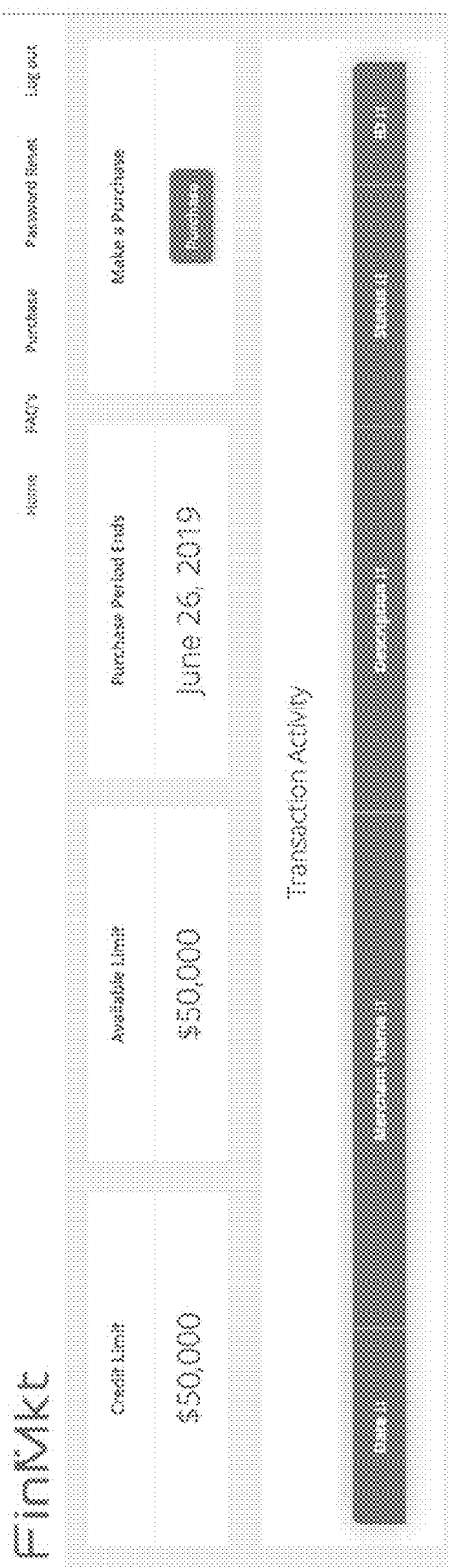
FIGS. 28 and 29 show illustrative examples of user interfaces for allowing a customer to receiving financing and initiate a purchase applying the received financing in accordance with some embodiments of the disclosed subject matter.
Figure 29:
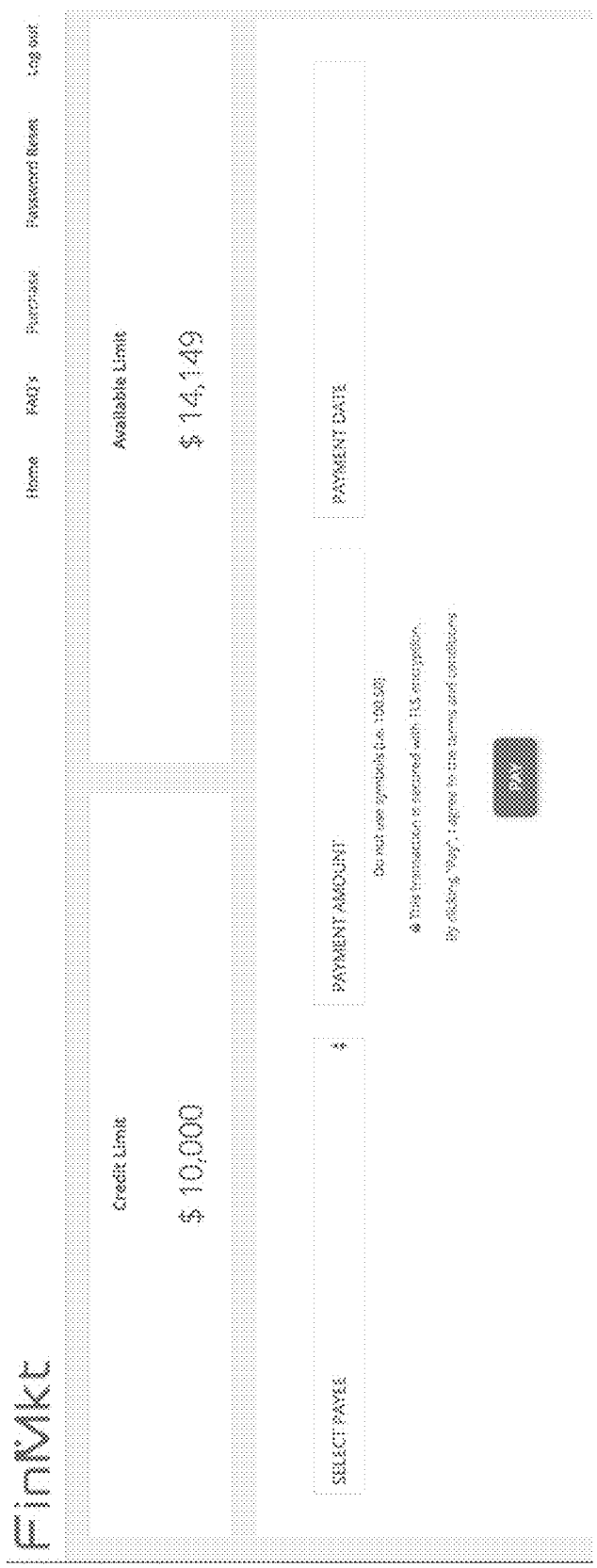

In some embodiments, in instances in which the consumer directly accesses the consumer portal component without having an identified merchant, the consumer portal component can allow the consumer to submit a consumer application to receive a funded account. If the consumer wishes to spend on goods or services using the fund account, the consumer can access the consumer portal component and, in turn, enter a merchant and initiate a closed loop direct funded transaction with that merchant. Illustrative user interfaces that can be presented to the consumer in the consumer portal component are shown in FIGS. 28 and 29. For example, in response to selecting a purchase interface element in FIG. 28, the consumer portal component can provide the consumer with an opportunity to select or input a merchant or payee along with a payment amount and a payment date as shown in FIG. 29. Additionally or alternatively, the merchant can initiate a closed loop direct funded transaction with the consumer.

It should be noted that, in some embodiments, the consumer portal component can include a closed-loop transaction platform component that provides the system with the ability to define and execute transactions. The closed-loop transaction platform component can, for example, limit transactions to a single merchant or expand transactions within a network of merchants, referral partners and/or retailers.

It should be noted that, although the embodiments described herein generally mention the customer receiving one or more lending options via a merchant website, this is merely illustrative. In some embodiments, a consumer portal component can be executed on a mobile computing device while the consumer is shopping at a merchant's physical location.

Figure 24:
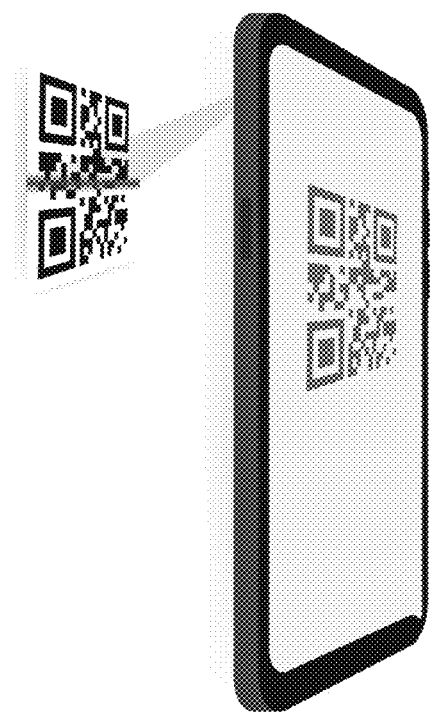
FIGS. 24 and 25 show illustrative examples of user interface screens on a mobile computing device in which a consumer at a merchant location can use the point of sale platform to obtain financing in accordance with some embodiments of the disclosed subject matter.
Figure 25:
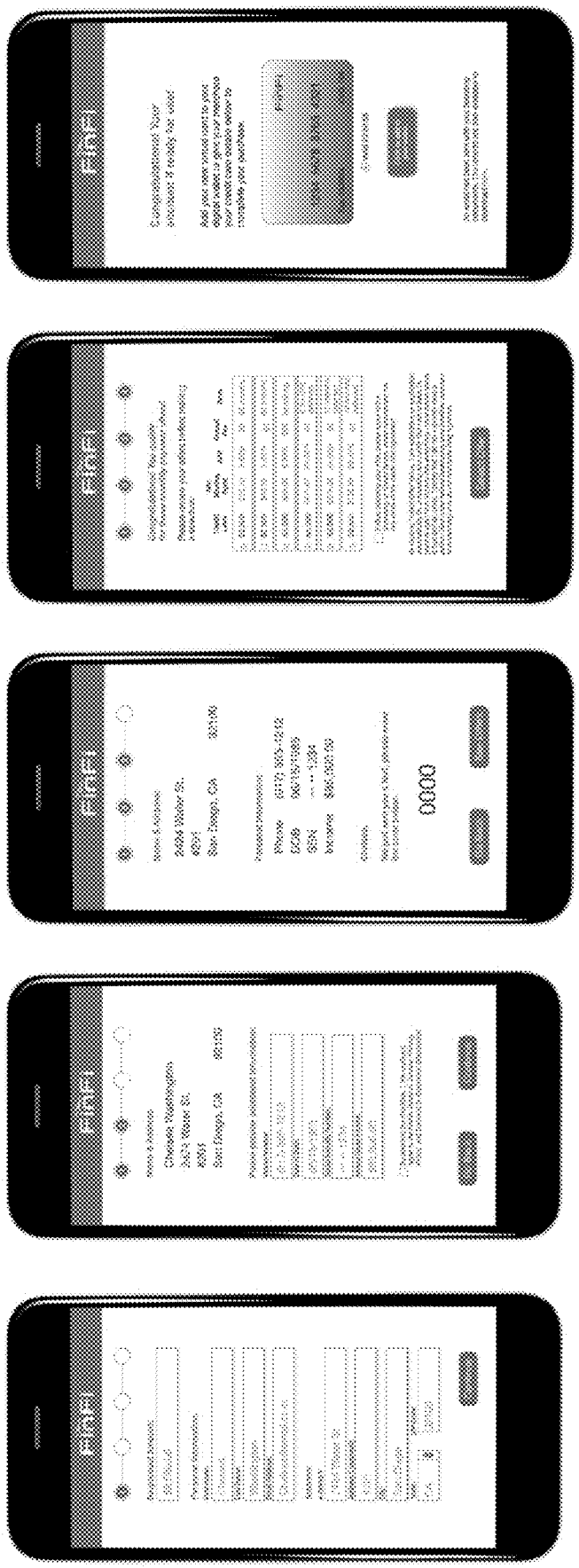

For example, as shown in FIGS. 24 and 25, a consumer portal component can be executed as a consumer application on a mobile computing device associated with the consumer. In a more particular example, the consumer can be provided with an opportunity to apply for financing by scanning a QR code or any other suitable code using an imaging application executing on the mobile computing device (as shown in FIG. 24). Such a code can be presented at a register associated with the merchant, on a merchant device executing the merchant portal component, etc. It should be noted that each code can be unique to each merchant. In response to obtaining the QR code using the imaging application executing on the mobile computing device, the consumer application can be executed on the mobile computing device and the consumer can be instructed to complete an application for financing (as shown in FIG. 25).

It should be noted that, in instances in which the mobile computing device has obtained the QR code and has determined that the consumer application has not been installed on the mobile computing device, the mobile computing device can direct the consumer to an application portal for downloading the consumer application so that the consumer can complete an application for financing.

Similar to FIG. 15, the mobile computing device can progress through completing the application for financing, verifying the consumer in receiving a one-time passcode, presenting one or more loan offers from multiple lenders for selection by the consumer, and receiving a confirmation that a selected offer has been approved.

Figure 26:
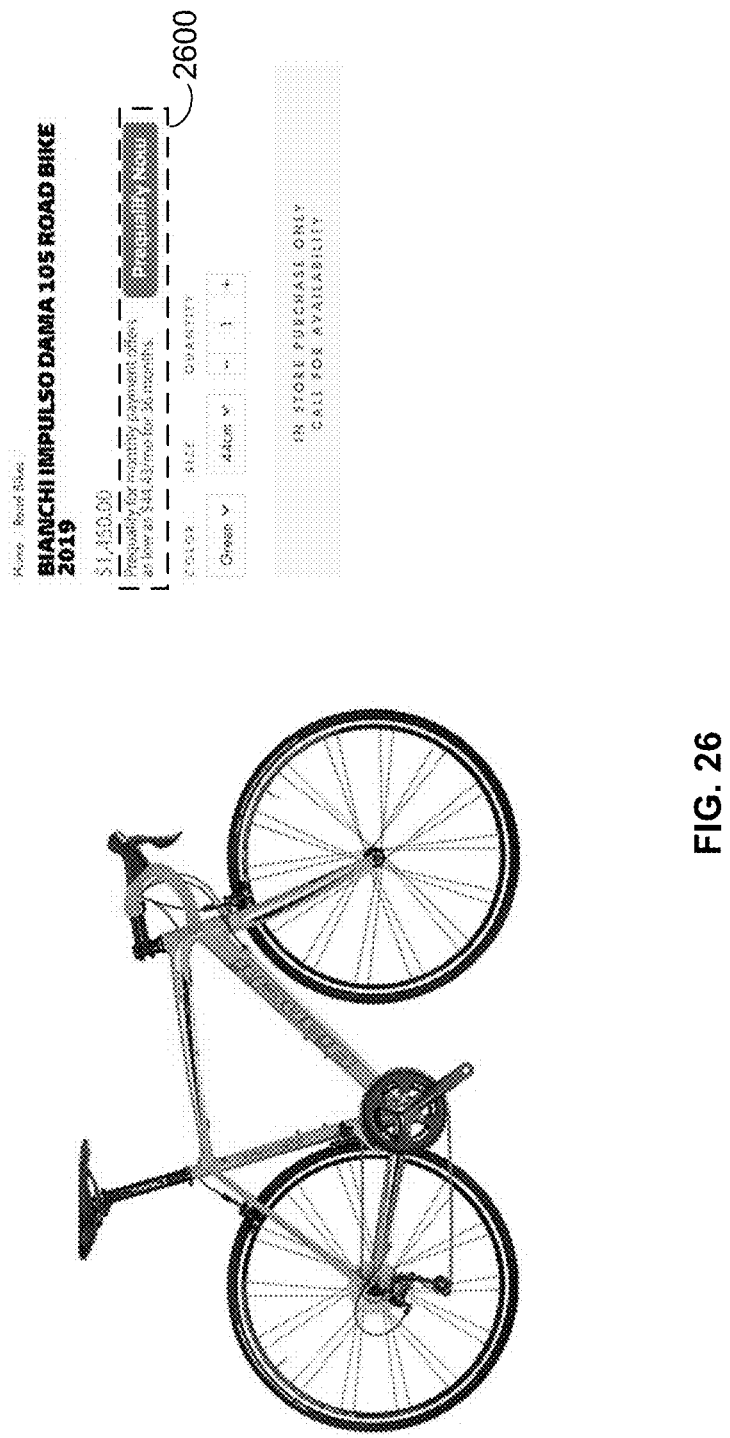
FIGS. 26 and 27 show illustrative examples of merchant user interfaces that integrate the prequalification interface elements and financing interface elements for receiving multiple financing offers from multiple lenders in accordance with some embodiments of the disclosed subject matter.
Figure 27:
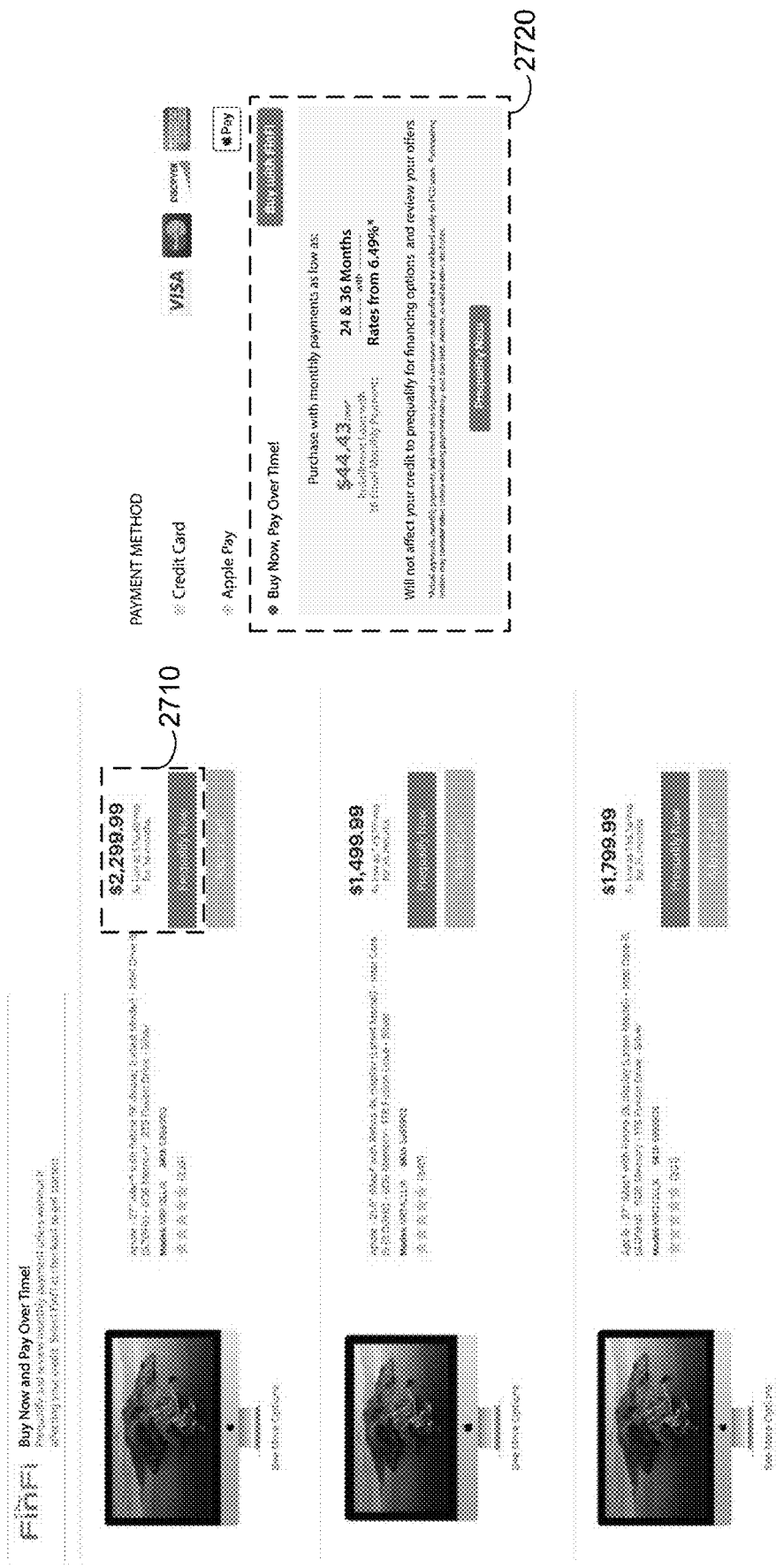

It should also be noted that the consumer portal component can be integrated with a merchant website in any suitable approach. For example, the merchant website can present the potential consumer with an opportunity to determine whether the consumer prequalifies for financing without affecting their credit. As shown at prequalification interface element 2600 of FIG. 26, the consumer portal component can be integrated with a shopping cart provided by a merchant in which a real-time, multiple lender point of sale financing platform is provided. That is, lending offers for financing a product or a service on a merchant website can be provided without affecting the credit or credit score of the potential consumer. In another example, the merchant website can present the potential consumer with an opportunity to determine whether the consumer prequalifies for lending offers without affecting their credit while browsing the merchant website or when checking out. For example, as shown in FIG. 27, the consumer can browse through items on the merchant website in which the consumer can be provided with an opportunity to determine whether the consumer may prequalify for financing without affecting their credit by selecting prequalification interface element 2710. In another example, as also shown in FIG. 27, the consumer can be provided with an opportunity to determine whether the consumer may prequalify for financing without affecting their credit when purchasing the item or items by selecting prequalification interface element 2720.

Lender Portal Component

In some embodiments, the mechanisms can include a lender portal component. The lender portal component can, for example, allow a lender device to check the status of consumer applications, access real-time reporting and analytics, mange users, configure portfolios, view invoice and billing statements, manage credit policy, review credit policy optimization recommendations, and manage plan offerings.

For example, once a consumer credit application has been approved, a new loan account can be created at the system of record (SOR) with the lender. It should be noted that the loan account can be created in any suitable matter. For example, in some embodiments, the mechanisms can support an API approach for new loan account requests. In another example, in some embodiments, the mechanisms can support a batch file integration approach for new loan account requests.

In some embodiments, the mechanisms can use machine learning to analyze loan performance against credit policy decisions. As loans mature, updated loan performance data can be continuously provided into a model. As the model runs, recommendations on policy modification can be made. For example, a model can suggest a 1% decrease in approvals, thereby resulting in a 55% decrease in losses.

In some embodiments, in response to a lender using the lender portal component to provide loan and/or risk parameters, loan products can be matched with borrower applications. For example, a loan allocation engine can automatically select lenders for loans based on lender portfolio investment strategy, thereby ensuring fairness and transparency in awarding loan products.

Referral Partner Portal

In some embodiments, the mechanisms can include a referral partner portal component. The referral partner portal component can, for example, provide a referral partner device with the ability to manage users, access real-time reporting and analytics, and view referral fee statements.

Overall System

Figure 32:
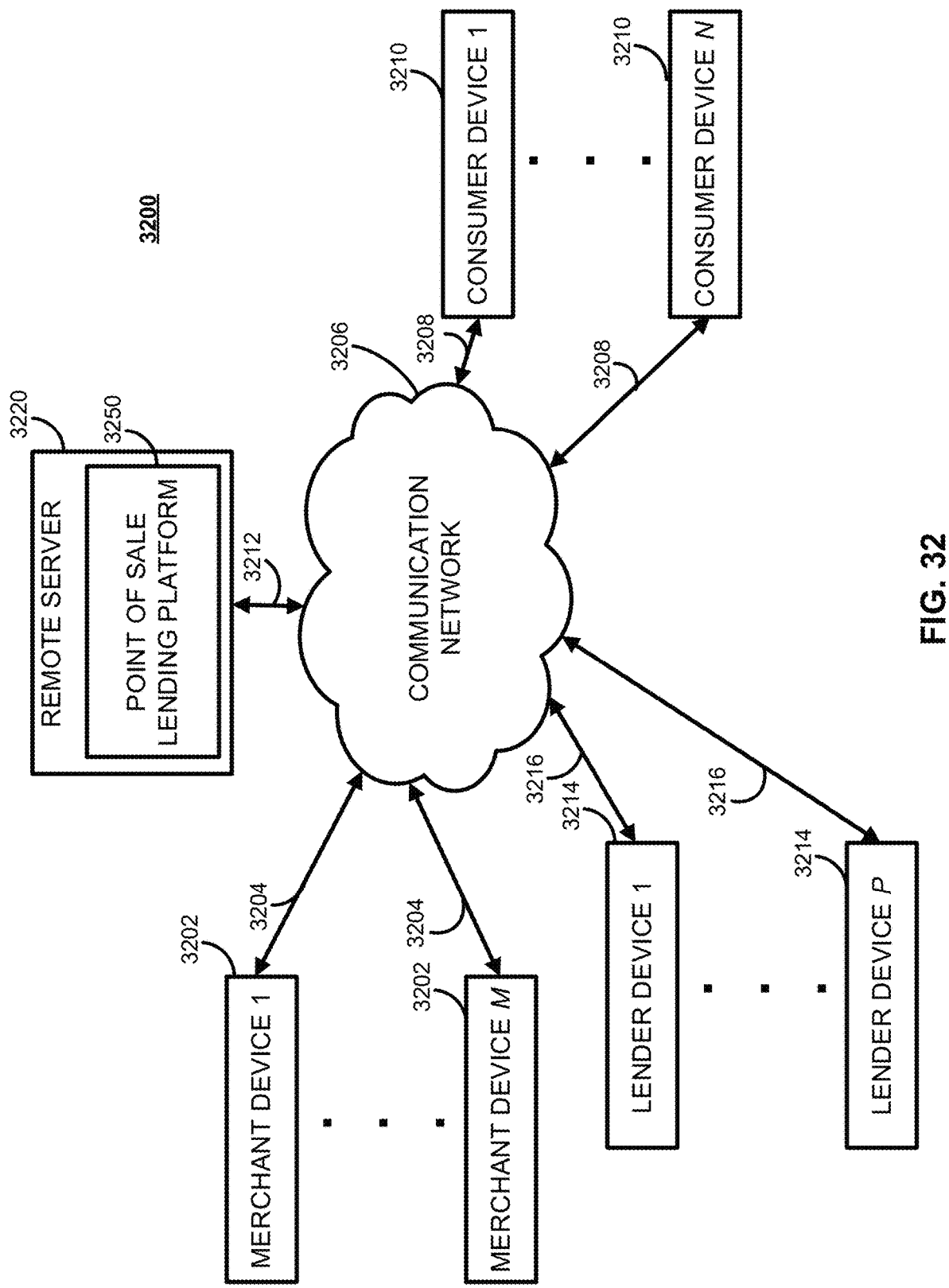
FIG. 32 shows an illustrative example of a generalized schematic diagram of a system on which the mechanisms for providing an automated loan production system as described herein can be implemented in accordance with some embodiments of the disclosed subject matter.

Turning to FIG. 32, FIG. 32 shows an example 3200 of a generalized schematic diagram of a system on which the mechanisms for offering multiple loan products by lenders to a consumer at a point-of sale as described herein can be implemented in accordance with some embodiments of the disclosed subject matter. As illustrated, system 3200 can include one or more merchant devices 3202. Merchant devices 3202 can be local to each other or remote from each other. Merchant devices 3202 can be connected by one or more communications links 3204 to a communication network 3206 that can be linked to a server 3220 via a communications link 1012.

Although two merchant devices 3202 are shown in FIG. 32 to avoid over-complicating the drawing, any suitable number of these devices, and any suitable types of these devices, can be used in some embodiments. For example, FIG. 32 indicates that merchant devices 1 through M can be connected to system 3200.

System 3200 can include one or more consumer devices 3210. Consumer devices 3210 can be local to each other or remote from each other. Consumer devices 3210 can be connected by one or more communications links 3208 to communication network 3206 that can be linked to server 3220 via communications link 3212 and/or merchant devices 3202 via communications link 1004.

Although two consumer devices 3210 are shown in FIG. 32 to avoid over-complicating the drawing, any suitable number of these devices, and any suitable types of these devices, can be used in some embodiments. For example, FIG. 32 indicates that consumer devices 1 through N can be connected to system 3200. In another example, one consumer device 3210 can be connected to a merchant webpage that is operated by merchant device 3202 while another consumer device 3210 can be physically located at a merchant location and can interact with merchant device 3202 (e.g., receiving a QR code to receive a consumer application).

System 3200 can include one or more lender devices 3214. Lender devices 3214 can be local to each other or remote from each other. Lender devices 3214 can be connected by one or more communications links 3216 to communication network 3206 that can be linked to server 3220 via communications link 3212 and/or merchant devices 3202 via communications link 1004.

Although two lender devices 3214 are shown in FIG. 32 to avoid over-complicating the drawing, any suitable number of these devices, and any suitable types of these devices, can be used in some embodiments. For example, FIG. 32 indicates that lender devices 1 through P can be connected to system 3200.

System 3200 can include one or more servers 3220. Server 3220 can be any suitable server or servers for providing access to the mechanisms described herein for offering multiple loan products by lenders to a consumer at a point-of sale, such as a processor, a computer, a data processing device, or any suitable combination of such devices. For example, the mechanisms for providing a marketplace lending network platform can be distributed into multiple backend components and multiple frontend components and/or user interfaces. In a more particular example, backend components, such as mechanisms for receiving merchant applications, determining whether to onboard a merchant, determining whether to validate a merchant, performing a fraud check on a potential merchant, receiving consumer applications, authenticating a consumer, determining whether a consumer is credit worthy, performing credit checks on the consumer, waterfalling loan offer presentation to the consumer based on lender requirements (e.g., consumer information and disclosure requirements), determining whether to transmit an adverse action notice to the consumer on behalf of a lender, transmit loan documents for electronic signature by the merchant and by the consumer, etc., can be performed on one or more servers 3220. In another particular example, frontend components, such as mechanisms for presenting user interfaces to users of the point of sale platform, presenting user interfaces for inputting merchant application information, presenting user interfaces for inputting consumer application information, presenting user interfaces that integrate loan offer information with a merchant webpage, presenting loan offer information on one or more consumer devices 3210, presenting rate sheet information and offer code information on one or more merchant devices 3202, etc., can be performed on one or more servers 3220.

In some embodiments, server 3220 can include an application templating engine that enables rapid deployment and ease of integration of one or more data sources. For example, the main code library of server 3220 can be continuously merged with new and/or updated code, where such new and/or updated code can be automatically regression tested. This can, for example, avoid delays and issues that typically occur when code is integrated into the main library on a periodic schedule. This can also, for example, ensure that the new and/or updated code added to the main code library has not adversely affected existing code or features of the platform. In addition to automated continuous integration of new and/or updated code, server 3320 can also include automated continuous delivery of new and/or updated code into the main code library. This can, for example, avoid the delays and issues that normally occur with periodic manual deployments. It should be noted that, in some embodiments, in response to making changes and updates to the code in the lower development environment, server 3220 can automatically deploy the new and/or updated code through each of the environments in server 3220. It should also be noted that a failed test in a higher environment may result in preventing or otherwise inhibiting that new and/or updated code from automatically propagating through each environment in server 3220. In some embodiments, the application templating engine can combine existing templates and new templates with the main code library and with the models executing on server 3220 to produce resulting documents, pages, etc. This can, for example, be used to rapidly onboard new features and/or partners to serve 3220.

Communications network 3206 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, one or more peer-to-peer connections, etc. Each of communications links 3204, 3208, 3212, and 3216 can be any communications links suitable for communicating data among merchant devices 3202, consumer device 3210, lender devices 3214, and server 3220, such as network links, dial-up links, wireless links, hard-wired links, any other suitable communications links, or any suitable combination of such links. Note that, in some embodiments, multiple servers 3220 can be used to provide access to different mechanisms associated with the mechanisms described herein for offering multiple loan products by lenders to a consumer at a point-of sale.

In situations in which the systems described herein collect personal information about borrowers, or make use of personal information, the borrowers may be provided with an opportunity to control whether programs or features collect borrower information (e.g., information about a borrower's profession, a borrower's preferences, or a borrower's current location). In addition, certain data may be treated in one or more ways before it is stored or used, so that personal information is removed. For example, borrower information and other information that can identify the borrower may be treated so that no personal information can be determined for the borrower. Thus, the borrower or an entity representing the borrower may have control over how information is collected about the borrower and used by a server.

In some embodiments, information stored in a loan inquiry information database can be stored such that personal information of a borrower is obscured. For example, borrower identifying information can be an assigned identification number and/or code name and other loan inquiry information and borrower preferences can be associated with such an identification number and/or code name.

Figure 33:
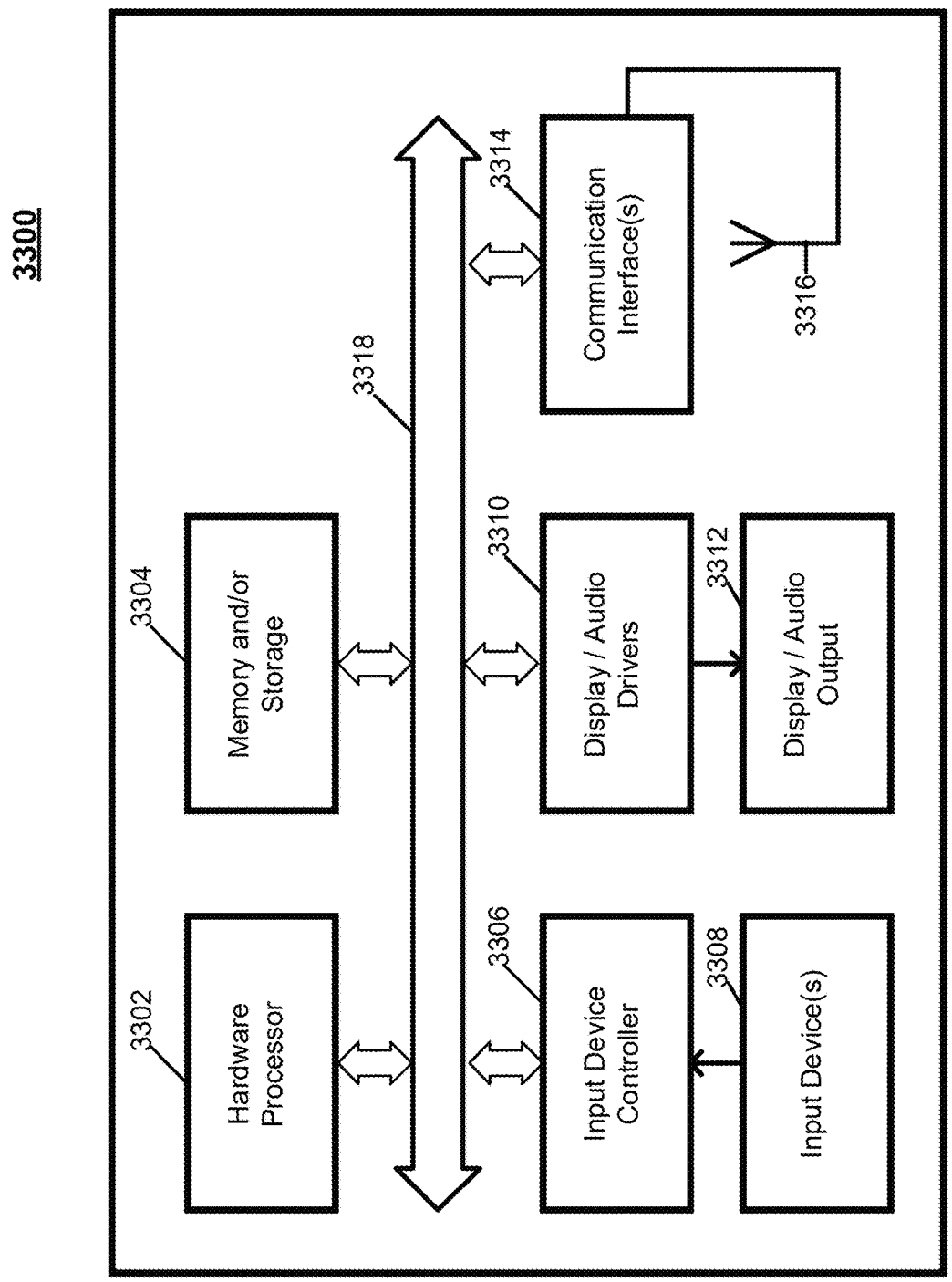
FIG. 33 shows an example of hardware that can be used to implement one or more merchant devices, consumer devices, and servers depicted in FIG. 32 in accordance with some embodiments of the disclosed subject matter.

Server 3220 and each of merchant devices 3202, consumer devices 3210, and lender device 3214 can be implemented using any suitable hardware in some embodiments. For example, in some embodiments, devices 3202, 3210, 3214, and 3220 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 3300 of FIG. 33, such hardware can include hardware processor 3302, memory and/or storage 3304, an input device controller 3306, an input device 3308, display/audio drivers 3310, display and audio output circuitry 3312, communication interface(s) 3314, an antenna 3316, and a bus 3318.

Hardware processor 3302 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 3302 can be controlled by a server program stored in memory and/or storage of a server, such as server 3220. In some embodiments, hardware processor 3302 can be controlled by a computer program stored in memory and/or storage 3304 of device 3202, 3210, and/or 3214.

Memory and/or storage 3304 can be any suitable memory and/or storage for storing programs, data, and/or any other suitable information in some embodiments. For example, memory and/or storage 3304 can include random access memory, read-only memory, flash memory, hard disk storage, optical media, and/or any other suitable memory.

Input device controller 3306 can be any suitable circuitry for controlling and receiving input from one or more input devices 3308 in some embodiments. For example, input device controller 3306 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 3310 can be any suitable circuitry for controlling and driving output to one or more display/audio output devices 3312 in some embodiments. For example, display/audio drivers 3310 can be circuitry for driving a touchscreen, a flat-panel display, a cathode ray tube display, a projector, a speaker or speakers, and/or any other suitable display and/or presentation devices.

Communication interface(s) 3314 can be any suitable circuitry for interfacing with one or more communication networks (e.g., communication network 3206). For example, interface(s) 3314 can include network interface card circuitry, wireless communication circuitry, and/or any other suitable type of communication network circuitry.

Antenna 3316 can be any suitable one or more antennas for wirelessly communicating with a communication network (e.g., communication network 3206) in some embodiments. In some embodiments, antenna 3316 can be omitted.

Bus 3318 can be any suitable mechanism for communicating between two or more components 3302, 3304, 3306, 3310, and 3314 in some embodiments.

Any other suitable components can be included in hardware 3300 in accordance with some embodiments.

In some embodiments, at least some of the above described blocks of the processes of FIGS. 2, 4, 10, 15, 30A, 30B, 31A, and 31B can be executed or performed in any order or sequence not limited to the order and sequence shown in and described in connection with the figures. Also, some of the above blocks of FIGS. 2, 4, 10, 15, 30A, 30B, 31A, and 31B can be executed or performed substantially simultaneously where appropriate or in parallel to reduce latency and processing times. Additionally or alternatively, some of the above described blocks of the processes of FIGS. 2, 4, 10, 15, 30A, 30B, 31A, and 31B can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, automated loan production systems, methods, and media are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A computer-implemented method comprising:
electronically receiving, by a point-of-sale platform that includes a hardware processor, from a merchant using a merchant device, a merchant application for incorporating loan offering features from the point-of-sale platform;
automatically determining, by the hardware processor, whether to approve the merchant application by determining a fraud score that includes the merchant that submitted the merchant application and one or more principals associated with the merchant, comparing the fraud score for the merchant against a risk matrix for one or more lenders for loan programs to determine whether to approve the merchant application, in response to determining that the merchant application should continue through underwriting based on the comparison of the fraud score for the merchant against the risk matrix, transmitting the merchant application and a plurality of gathered merchant evidence to a queue associated with a human underwriter for review, and approving the merchant application based on the plurality of gathered merchant evidence and based on clearance of one or more fraud conditions;
in response to approving the merchant application based on the plurality of gathered merchant evidence and based on the clearance of the one or more fraud conditions, causing, by the hardware processor, a first user interface for generating a plurality of rate sheets to be presented and assigning at least one of the plurality of rate sheets to an offer that is presented on a merchant page;
electronically receiving, via the merchant page, by the hardware processor, from a consumer using a consumer device, a consumer application for receiving financing from a plurality of lenders to purchase a product on the merchant page;
in response to electronically receiving the consumer application for receiving financing from at least a portion of the plurality of lenders to purchase the product on the merchant webpage, automatically determining, by hardware processor, whether to approve the consumer application by generating a snapshot of the consumer over a particular time period by searching through a plurality of online sources, transmitting the generated snapshot to a fraud learning model executed by the hardware processor of the point-of-sale platform that determines a probability that indicates the likelihood that the consumer is authentic based on the generated snapshot, and approving the consumer application based on the probability that the consumer is authentic being greater than a threshold probability value;

in response to approving the consumer application, performing, by the hardware processor, a first credit pull of the consumer;

determining, by the hardware processor, a plurality of lending offers that match consumer requirements for purchasing the product on the merchant page and one or more lender requirements;

causing, via the merchant webpage, by the hardware processor, at least a portion of the plurality of lending offers to be presented to the consumer device;

electronically receiving, via the merchant webpage, by the hardware processor, a selection of a lending offer;

performing, by the hardware processor, a second credit pull of the consumer in response to electronically receiving the selection of the lending offer via the merchant webpage;

electronically receiving, by the hardware processor, a completion certificate to the consumer in which the consumer is provided with an opportunity to electronically sign the completion certificate and approve a funding amount to purchase the product on the merchant webpage; and in response to receiving the completion certificate that has been electronically signed by the consumer, initiating, by the hardware processor, the purchase of the product on the merchant website and automatically transmitting a request for the funding amount from a lender associated with the selected lending offer to a merchant account.

2. The method of claim 1, further comprising determining whether at least one of the merchant and the one or more principals associated with the merchant is included on a real-time block list based on at least one of device information, identity information, email information, phone information, address information, IP information, and location information.

3. The method of claim 1, wherein the plurality of gathered merchant evidence includes consumer reviews of the merchant from the plurality of online sources.

4. The method of claim 1, wherein the plurality of gathered merchant evidence includes transmitting a query that includes merchant details and receiving search results responsive to the transmitted query.

5. The method of claim 1, wherein the offer is presented concurrently with the product on the merchant page.

6. The method of claim 1, wherein the offer is presented when checking out on the merchant page.

7. The method of claim 1, wherein the merchant page is presented on the merchant device at a location.

8. The method of claim 1, further comprising determining that information collected from the consumer application and that a plurality of presented disclosures meet the one or more lender requirements of a first lender and does not meet the one or more lender requirements of a second lender prior to presenting the plurality of loan offers, wherein the one or more lender requirements of the second lender includes additional consumer information and different disclosures and wherein the plurality of lending offers include lending offers from the first lender and exclude lending offers from the second lender.

9. The method of claim 8, wherein the method further comprises pausing a loan matching engine from determining whether loan offers from the second lender match the consumer requirements for purchasing the product on the merchant page.

10. The method of claim 9, wherein the method further comprises:
    determining that the additional consumer information has been received and that the different disclosures have been presented to the consumer;
    causing the loan matching engine to resume the determination of whether loan offers from the second lender match the consumer requirements for purchasing the product on the merchant page; and
    updating the plurality of lending offers to include lending offers from the first lender and the second lender.

11. The method of claim 1, wherein each of the plurality of rate sheets is associated with at least one of a plan description, a plan type, a term, and a merchant fee.

12. The method of claim 1, wherein automatically determining whether to approve the consumer application further comprises verifying an identity of the consumer that submitted the consumer application, wherein the consumer application is approved based at least in part on the verified identity of the consumer.

13. The method of claim 1, wherein the first credit pull is a soft credit pull and the second credit pull is a hard credit pull.

14. The method of claim 1, wherein the first credit pull of the consumer is an internal soft credit pull as authorized by a subset of the plurality of lenders.

15. The method of claim 1, wherein the first credit pull of the consumer is an external soft credit pull corresponding to a configuration from each of a subset of the plurality of lenders.

16. The method of claim 1, wherein the method further comprises receiving and recording payments from the customer, wherein notifications are transmitted to the consumer device in response to receiving each payment.

17. The method of claim 1, wherein the snapshot of the consumer is generated in response to determining that a threshold amount of consumer information has been received over the particular time period.

18. The method of claim 1, wherein the point-of-sale platform includes an automated merchant underwriting system having one or more neural networks and wherein the one or more neural networks are configured to process the merchant application to generate the fraud score for the merchant.

19. A system comprising:
    a server that includes a hardware processor, wherein the hardware processor is configured to:
        electronically receive, from a merchant using a merchant device, a merchant application for incorporating loan offering features from the point-of-sale platform;
        automatically determine whether to approve the merchant application by determining a fraud score that includes the merchant that submitted the merchant application and one or more principals associated with the merchant, comparing the fraud score for the merchant against a risk matrix for one or more lenders for loan programs to determine whether to approve the merchant application, in response to determining that the merchant application should continue through underwriting based on the comparison of the fraud score for the merchant against the risk matrix, transmitting the merchant application and a plurality of gathered merchant evidence to a queue associated with a human underwriter for review, and approving the merchant application based on the plurality of gathered merchant evidence and based on clearance of one or more fraud conditions;

in response to approving the merchant application based on the plurality of gathered merchant evidence and based on the clearance of the one or more fraud conditions, cause a first user interface for generating a plurality of rate sheets to be presented and assigning at least one of the plurality of rate sheets to an offer that is presented on a merchant page;

electronically receive, via the merchant page, from a consumer using a consumer device, a consumer application for receiving financing from a plurality of lenders to purchase a product on the merchant page;

in response to electronically receiving the consumer application for receiving financing from at least a portion of the plurality of lenders to purchase the product on the merchant webpage, automatically determine whether to approve the consumer application by generating a snapshot of the consumer over a particular time period by searching through a plurality of online sources, transmitting the generated snapshot to a fraud learning model executed by the hardware processor of the point-of-sale platform that determines a probability that indicates the likelihood that the consumer is authentic based on the generated snapshot, and approving the consumer application based on the probability that the consumer is authentic being greater than a threshold probability value;

in response to approving the consumer application, perform a first credit pull of the consumer;

determine a plurality of lending offers that match consumer requirements for purchasing the product on the merchant page and one or more lender requirements;

cause, via the merchant webpage, at least a portion of the plurality of lending offers to be presented to the consumer device;

electronically receive, via the merchant webpage, a selection of a lending offer;

perform a second credit pull of the consumer in response to electronically receiving the selection of the lending offer via the merchant webpage;

electronically receive a completion certificate to the consumer in which the consumer is provided with an opportunity to electronically sign the completion certificate and approve a funding amount to purchase the product on the merchant webpage; and in response to receiving the completion certificate that has been electronically signed by the consumer, initiate the purchase of the product on the merchant website and automatically transmit a request for the funding amount from a lender associated with the selected lending offer to a merchant account.

20. A non-transitory computer-readable medium containing computer executable instructions that, when executed by a processor, cause the processor to perform a method, the method comprising:

electronically receiving, by a point-of-sale platform that includes a hardware processor, from a merchant using a merchant device, a merchant application for incorporating loan offering features from the point-of-sale platform;

automatically determining, by the hardware processor, whether to approve the merchant application by determining a fraud score that includes the merchant that submitted the merchant application and one or more principals associated with the merchant, comparing the fraud score for the merchant against a risk matrix for one or more lenders for loan programs to determine whether to approve the merchant application, in response to determining that the merchant application should continue through underwriting based on the comparison of the fraud score for the merchant against the risk matrix, transmitting the merchant application and a plurality of gathered merchant evidence to a queue associated with a human underwriter for review, and approving the merchant application based on the plurality of gathered merchant evidence and based on clearance of one or more fraud conditions;

in response to approving the merchant application based on the plurality of gathered merchant evidence and based on the clearance of the one or more fraud conditions, causing, by the hardware processor, a first user interface for generating a plurality of rate sheets to be presented and assigning at least one of the plurality of rate sheets to an offer that is presented on a merchant page;

electronically receiving, via the merchant page, by the hardware processor, from a consumer using a consumer device, a consumer application for receiving financing from a plurality of lenders to purchase a product on the merchant page;

in response to electronically receiving the consumer application for receiving financing from at least a portion of the plurality of lenders to purchase the product on the merchant webpage, automatically determining, by hardware processor, whether to approve the consumer application by generating a snapshot of the consumer over a particular time period by searching through a plurality of online sources, transmitting the generated snapshot to a fraud learning model executed by the hardware processor of the point-of-sale platform that determines a probability that indicates the likelihood that the consumer is authentic based on the generated snapshot, and approving the consumer application based on the probability that the consumer is authentic being greater than a threshold probability value;

in response to approving the consumer application, performing, by the hardware processor, a first credit pull of the consumer;

determining, by the hardware processor, a plurality of lending offers that match consumer requirements for purchasing the product on the merchant page and one or more lender requirements;

causing, via the merchant webpage, by the hardware processor, at least a portion of the plurality of lending offers to be presented to the consumer device;

electronically receiving, via the merchant webpage, by the hardware processor, a selection of a lending offer;

performing, by the hardware processor, a second credit pull of the consumer in response to electronically receiving the selection of the lending offer via the merchant webpage;

electronically receiving, by the hardware processor, a completion certificate to the consumer in which the consumer is provided with an opportunity to electronically sign the completion certificate and approve a funding amount to purchase the product on the merchant webpage; and in response to receiving the completion certificate that has been electronically signed by the consumer, initiating, by the hardware processor, the purchase of the product on the merchant website and automatically transmitting a request for the funding amount from a lender associated with the selected lending offer to a merchant account.

\* \* \* \* \*